(12) United States Patent
Mo et al.

(10) Patent No.: US 11,843,651 B2
(45) Date of Patent: Dec. 12, 2023

(54) PERSONALIZED RECOMMENDATION METHOD AND SYSTEM, AND TERMINAL DEVICE

(71) Applicant: Huawei Technologies Co., Ltd., Shenzhen (CN)

(72) Inventors: Lan Mo, Nanjing (CN); Xun Hu, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 123 days.

(21) Appl. No.: 17/601,009

(22) PCT Filed: Mar. 31, 2020

(86) PCT No.: PCT/CN2020/082429
§ 371 (c)(1),
(2) Date: Oct. 1, 2021

(87) PCT Pub. No.: WO2020/200199
PCT Pub. Date: Oct. 8, 2020

(65) Prior Publication Data
US 2022/0150292 A1 May 12, 2022

(30) Foreign Application Priority Data

Apr. 3, 2019 (CN) .......................... 201910266830.1

(51) Int. Cl.
*H04L 65/612* (2022.01)
*G06F 16/9535* (2019.01)

(52) U.S. Cl.
CPC ........ *H04L 65/612* (2022.05); *G06F 16/9535* (2019.01); *G06F 2218/12* (2023.01)

(58) Field of Classification Search
CPC . H04L 65/612; G06F 16/9535; G06F 2218/12
See application file for complete search history.

(56) References Cited

U.S. PATENT DOCUMENTS

| 8,521,594 B1 * | 8/2013 | Skoe | G06Q 30/02 705/14.66 |
| 8,849,843 B1 * | 9/2014 | George | G06F 16/80 707/E17.127 |

(Continued)

FOREIGN PATENT DOCUMENTS

| CN | 101334792 A | 12/2008 |
| CN | 102411596 A | 4/2012 |

(Continued)

OTHER PUBLICATIONS

Xu, Jie, "Research on Service Reputation Recommending User Reputation Evaluation System," Feb. 2019, with an English Abstract, 2 pages.

(Continued)

*Primary Examiner* — Jeong S Park
(74) *Attorney, Agent, or Firm* — Slater Matsil, LLP

(57) ABSTRACT

A personalized recommendation method and system, and a terminal device are provided. The method includes: The terminal device sends service content request information to a service system; the terminal device receives service content response information sent by the service system, where the service content response information includes a service content candidate set, the service content candidate set includes a plurality of pieces of service content, and the service content candidate set is obtained by the service system based on a user behavior event reported by the terminal device; the terminal device determines one or more pieces of service content from the service content candidate set based on user-authorized data; and the terminal device displays the one or more pieces of service content to a user.

14 Claims, 10 Drawing Sheets

(56) References Cited

U.S. PATENT DOCUMENTS

| | | | |
|---|---|---|---|
| 2007/0214207 A1 | 9/2007 | Xie et al. | |
| 2009/0300016 A1* | 12/2009 | Kile, Jr. | G06F 3/0482 |
| 2011/0041157 A1* | 2/2011 | Dasher | H04N 21/4826 |
| | | | 725/98 |
| 2011/0088051 A1* | 4/2011 | Zhu | H04N 21/4756 |
| | | | 725/46 |
| 2013/0055056 A1 | 2/2013 | Sabur | |
| 2015/0348106 A1* | 12/2015 | Yao | G06Q 30/0261 |
| | | | 705/14.54 |
| 2016/0042252 A1* | 2/2016 | Sawhney | G06F 16/5838 |
| | | | 382/190 |
| 2016/0188725 A1* | 6/2016 | Wang | G06F 16/9535 |
| | | | 707/734 |

FOREIGN PATENT DOCUMENTS

| | | |
|---|---|---|
| CN | 102498497 A | 6/2012 |
| CN | 102956009 A | 3/2013 |
| CN | 103368898 A | 10/2013 |
| CN | 103457978 A | 12/2013 |
| CN | 103593434 A | 2/2014 |
| CN | 103810162 A | 5/2014 |
| CN | 104298719 A | 1/2015 |
| CN | 104965890 A | 10/2015 |
| CN | 106326277 A | 1/2017 |
| CN | 107123057 A | 9/2017 |
| CN | 108322523 A | 7/2018 |
| CN | 108763314 A | 11/2018 |
| CN | 109034907 A | 12/2018 |
| CN | 109154939 A | 1/2019 |
| CN | 109359242 A | 2/2019 |
| CN | 109375309 A | 2/2019 |
| CN | 109376309 A | 2/2019 |
| CN | 109416692 A | 3/2019 |
| CN | 110059249 A | 7/2019 |
| EP | 2650800 A1 | 10/2013 |

OTHER PUBLICATIONS

Mao, Yuxin, "Research on Privacy Image Exposure of Product Recommendation Service in E-Commerce Environment," Oct. 2018, with an English Abstract, 4 pages.

* cited by examiner

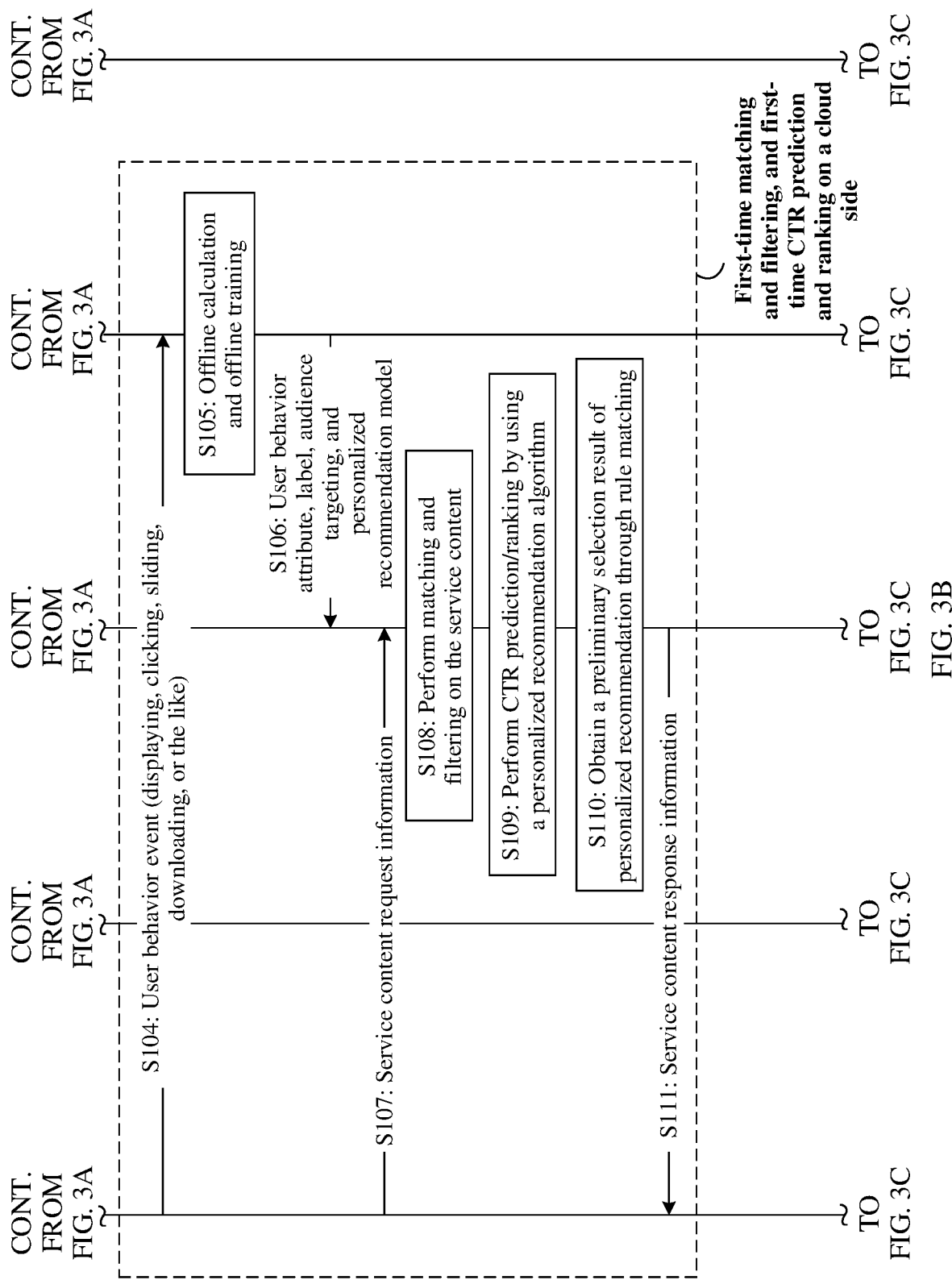

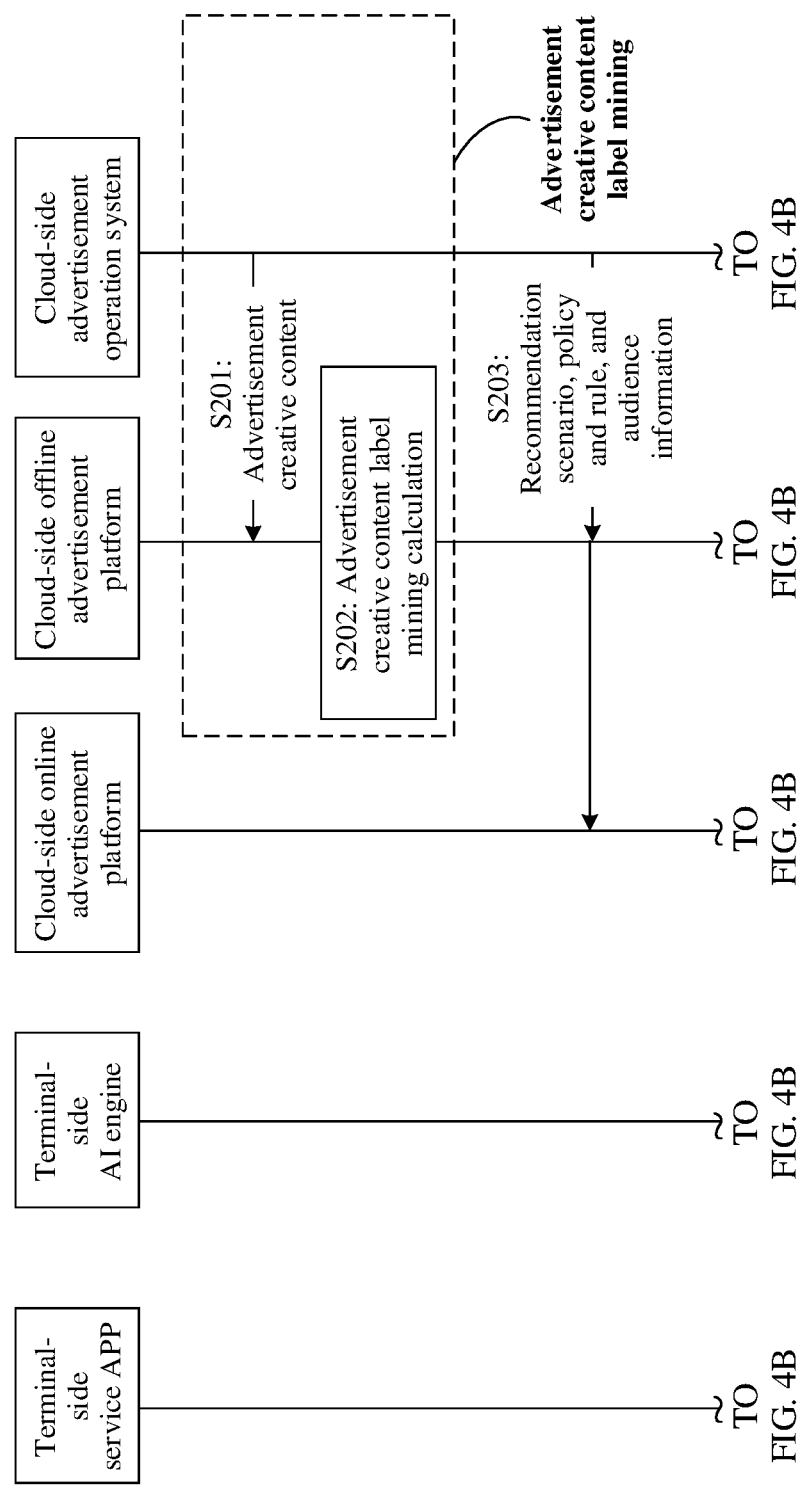

PERSONALIZED RECOMMENDATION METHOD AND SYSTEM, AND TERMINAL DEVICE

CROSS-REFERENCE TO RELATED APPLICATIONS

This application is a national stage of International Application No. PCT/CN2020/082429, filed on Mar. 31, 2020, which claims priority to Chinese Patent Application No. 201910266830.1, filed on Apr. 3, 2019. Both of the aforementioned applications are hereby-incorporated by reference in their entireties.

TECHNICAL FIELD

This application relates to the data processing field, and more specifically, to a personalized recommendation method and system, and a terminal device.

BACKGROUND

Rapid development of mobile Internet helps users conveniently obtain needed rich information and services anytime and anywhere. However, how to quickly win in the existing multi-party competitive business ecosystem, quickly capture attention of the users, and achieve greater commercial benefits requires deep thinking about how to be truly user-centered and provide more real-time, accurate, and personalized high-quality service content.

In an existing personalized recommendation scenario, although a terminal side stores rich personal privacy data of the users, for a purpose of privacy protection, a cloud side can obtain only limited user data. Consequently, accuracy of personalized recommendation service content that is output by the cloud side may be low, and therefore a user requirement cannot be met.

SUMMARY

This application provides a personalized recommendation method and system, and a terminal device, to help improve accuracy of personalized recommendation.

According to a first aspect, a personalized recommendation method is provided. The method includes: A terminal device sends service content request information to a service system; the terminal device receives service content response information sent by the service system, where the service content response information includes a service content candidate set, the service content candidate set includes a plurality of pieces of service content, and the service content candidate set is obtained by the service system based on a user behavior event reported by the terminal device; the terminal device determines one or more pieces of service content from the service content candidate set based on user-authorized data; and the terminal device displays the one or more pieces of service content to a user.

According to the personalized recommendation method in the embodiments of this application, advantages of comprehensiveness and accuracy of user data on a terminal side can be fully exerted; no additional user data needs to be uploaded, but only secure filtering and accurate matching need to be performed in a downstream direction to obtain service content that meets a user requirement. In this way, on a basis of high recall of service content recommended by the service system, in combination with the advantages of the user data stored in the terminal device, accuracy of personalized recommendation is high. High-recall and high-accuracy personalized recommendation service experience is provided through cooperation between two times of personalized recommendation based on device-cloud collaboration.

With reference to the first aspect, in a possible implementation of the first aspect, the service content response information further includes label information of each piece of service content in the service content candidate set. That the terminal device determines one or more pieces of service content from the service content candidate set based on user-authorized data includes: The terminal device determines the one or more pieces of service content based on the user-authorized data and the label information of each piece of service content in the service content candidate set.

According to the personalized recommendation method in the embodiments of this application, a service content candidate set list sent by the service system to the terminal device further includes a semantic label corresponding to the service content candidate set, and all the information is sent to the terminal device together. In this way, the terminal device may further perform matching and filtering with reference to data in a user knowledge base stored in the terminal device and the semantic label, to improve accuracy of personalized recommendation.

With reference to the first aspect, in a possible implementation of the first aspect, that the terminal device determines the one or more pieces of service content based on the user-authorized data and the label information of each piece of service content in the service content candidate set includes: The terminal device determines, based on the user-authorized data and the label information of each piece of service content, a correlation coefficient between each piece of service content and the user-authorized data; and the terminal device determines the one or more pieces of service content based on the correlation coefficient.

According to the personalized recommendation method in the embodiments of this application, the terminal device may determine, based on the data in the user knowledge base stored in the terminal device and the semantic label, a correlation coefficient between service content corresponding to the semantic label and the data in the user knowledge base, and determine, by using a plurality of calculated correlation coefficients, service content finally displayed to the user. This helps improve accuracy of personalized recommendation.

In some possible implementations, the terminal device may determine a plurality of correlation coefficients based on the label information of each of the plurality of pieces of service content and the user-authorized data; and the terminal device may display, to the user, service content corresponding to a correlation coefficient that is greater than or equal to a preset value among the plurality of correlation coefficients.

With reference to the first aspect, in a possible implementation of the first aspect, the service content is massive service content that is of the service system and that is with real-time update.

According to the personalized recommendation method in the embodiments of this application, the terminal device stores the complete data of the user knowledge base, but the terminal device does not store service content or stores only incomplete and non-real-time partial service content. Therefore, on a basis that a personalized recommendation algorithm model of the terminal device needs to find massive real-time updated service content based on one-time recommendation of the service system, advantages of high quality and integrity of local user data in the terminal device are fully exerted. This helps improve accuracy of personalized recommendation.

With reference to the first aspect, in a possible implementation of the first aspect, the service content includes one or more of an advertisement service, a video service, or a news service.

According to a second aspect, a personalized recommendation method is provided. The method includes: A service system receives service content request information sent by a terminal device; the service system determines a service content candidate set based on the service content request information, where the service content candidate set includes a plurality of pieces of service content; the service system sends service content response information to the terminal device, where the service content response information includes the service content candidate set; the terminal device determines one or more pieces of service content from the service content candidate set based on user-authorized data; and the terminal device displays the one or more pieces of service content to a user.

According to the personalized recommendation method in the embodiments of this application, advantages of comprehensiveness and accuracy of user data in the terminal device can be fully exerted; the terminal device does not need to upload additional user data to the service system, but only needs to perform secure filtering and accurate matching in a downstream direction to obtain service content that meets a user requirement. In this way, on a basis of high recall of service content in one-time recommendation of the service system, in combination with the advantages of comprehensiveness and accuracy of the user data stored in the terminal device, accuracy of personalized recommendation is high. High-recall and high-accuracy personalized recommendation service experience is provided through cooperation between two times of personalized recommendation based on device-cloud collaboration.

With reference to the second aspect, in a possible implementation of the second aspect, the service content response information further includes label information of each piece of service content in the service content candidate set. That the terminal device determines one or more pieces of service content from the service content candidate set based on user-authorized data includes: The terminal device determines the one or more pieces of service content based on the user-authorized data and the label information of each piece of service content in the service content candidate set.

According to the personalized recommendation method in the embodiments of this application, a service content candidate set list sent by the service system to the terminal device further includes a semantic label corresponding to the service content candidate set, and all the information is sent to the terminal device together. In this way, the terminal device may further perform matching and filtering with reference to data in a user knowledge base stored in the terminal device and the semantic label, to improve accuracy of personalized recommendation.

With reference to the second aspect, in a possible implementation of the second aspect, that the terminal device determines the one or more pieces of service content based on the user-authorized data and the label information of each piece of service content in the service content candidate set includes: The terminal device determines, based on the user-authorized data and the label information of each piece of service content, a correlation coefficient between each piece of service content and the user-authorized data; and the terminal device determines the one or more pieces of service content based on the correlation coefficient.

According to the personalized recommendation method in the embodiments of this application, the terminal device may determine, based on the data in the user knowledge base stored in the terminal device and the semantic label, a correlation coefficient between service content corresponding to the semantic label and the data in the user knowledge base, and determine, by using a plurality of calculated correlation coefficients, service content finally displayed to the user. This helps improve accuracy of personalized recommendation.

With reference to the second aspect, in a possible implementation of the second aspect, before the service system sends service content response information to the terminal device, the method further includes: The service system determines the label information of each piece of service content according to a preset algorithm.

According to the personalized recommendation method in the embodiments of this application, in a matching, screening, and filtering process for improving a correlation between service content and the user, mining calculation on a semantic and structured content label of the service content is performed in the service system in a unified manner. Therefore, in addition to implementing rule matching and filtering on the service content and a user service attribute by using a label of the service content in a personalized recommendation process of the service system, the service content candidate set list that is output through one-time recommendation and that is sent by the service system to the terminal device may further include the semantic label corresponding to the service content candidate set. The service system sends all the information to the terminal device together. In this way, the terminal device further performs matching and filtering with reference to the data in the user knowledge base in the terminal device and the content label, thereby helping improve accuracy of personalized recommendation.

With reference to the second aspect, in a possible implementation of the second aspect, that the service system determines a service content candidate set based on the service content request information includes: The service system receives a user behavior event sent by the terminal device; the service system determines a user behavior attribute and user audience group information based on the user behavior event; the service system determines, based on the user behavior attribute and the user audience group information, the service content candidate set from service content stored in the service system.

In the embodiments of this application, the service system mainly implements preliminary selection for personalized recommendation, and finds, based on limited user data in the service system, massive service content that may match a user requirement, to implement functions of high-recall one-time screening, CTR prediction, and ranking.

With reference to the second aspect, in a possible implementation of the second aspect, the service content is one or more of pieces of massive service content that is of the service system and that is with real-time update.

With reference to the second aspect, in a possible implementation of the second aspect, the service content is an advertisement service, a video service, or a news service.

According to the personalized recommendation method in the embodiments of this application, the terminal device stores the complete data of the user knowledge base, but the terminal device does not store service content or stores only incomplete and non-real-time partial service content. Therefore, on a basis that a personalized recommendation algorithm model of the terminal device needs to find massive real-time updated service content based on one-time recommendation of the service system, advantages of high quality and integrity of local user data in the terminal device are fully exerted. This helps improve accuracy of personalized recommendation.

According to a third aspect, a personalized recommendation method is provided. The method is applied to a personalized recommendation system. The personalized recommendation system includes a terminal device and a service system, where the terminal device includes a processor and a memory, the memory stores one or more programs, and the service system includes a service operation management system, an online service system, and an offline service system. The method includes the following steps. The service operation management system sends a first service content candidate set to the offline service system; the offline service system determines label information of service content in the first service content candidate set according to a preset algorithm; the offline service system sends the label information of the service content in the first service content candidate set to the online service system; the online service system receives service content request information sent by the terminal device; the online service system determines a second service content candidate set from the first service content candidate set based on the service content request information, where the second service content candidate set includes a plurality of pieces of service content; the online service system sends service content response information to the terminal device, where the service content response information includes the second service content candidate set and label information of each piece of service content in the second service content candidate set; the terminal device determines one or more pieces of service content from the plurality of pieces of service content based on user-authorized data and the label information of each piece of service content; and the terminal device displays the one or more pieces of service content to a user.

With reference to the third aspect, in a possible implementation of the third aspect, that the terminal device determines one or more pieces of service content from the plurality of pieces of service content based on user-authorized data and the label information of each piece of service content includes: The terminal device determines, based on the user-authorized data and the label information of each piece of service content, a correlation coefficient between each piece of service content and the user-authorized data; and the terminal device determines the one or more pieces of service content based on the correlation coefficient.

With reference to the third aspect, in a possible implementation of the third aspect, the method further includes: The offline service system receives a user behavior event sent by the terminal device; the offline service system determines a user behavior attribute and user audience group information based on the user behavior event; and the offline service system sends the user behavior attribute and the user audience group information to the online service system.

With reference to the third aspect, in a possible implementation of the third aspect, that the online service system determines a second service content candidate set from the first service content candidate set based on the service content request information includes: The online service system determines the second service content candidate set from the first service content candidate set based on the user behavior attribute, the user audience group information, and the label information of the service content in the first service content candidate set.

With reference to the third aspect, in a possible implementation of the third aspect, the service content is one or more of pieces of massive service content that is of the service system and that is with real-time update.

With reference to the third aspect, in a possible implementation of the third aspect, the service content is an advertisement service, a video service, or a news service.

According to a fourth aspect, a personalized recommendation method is provided. The method includes: A service system determines label information of service content in a first service content candidate set; the service system receives service content request information sent by a terminal device; the service system determines a second service content candidate set from the first service content candidate set based on the service content request information, where the second service content candidate set includes a plurality of pieces of service content; and the service system sends the plurality of pieces of service content and label information corresponding to the plurality of pieces of service content to the terminal device.

With reference to the fourth aspect, in a possible implementation of the fourth aspect, before the service system receives service content request information sent by a terminal device, the method further includes: The service system receives a user behavior event sent by the terminal device; and the service system determines a user behavior attribute and user audience group information based on the service behavior event. That the service system determines a second service content candidate set from the first service content candidate set includes: The service system determines the second service content candidate set from the first service content candidate set based on the user behavior attribute, the user audience group information, and the label information of the service content in the first service content candidate set.

With reference to the fourth aspect, in a possible implementation of the fourth aspect, that a service system determines label information of service content in a first service content candidate set includes: The service system determines the label information of the service content in the first service content candidate set according to a preset algorithm.

According to a fifth aspect, a terminal device is provided. The terminal device includes a touchscreen, one or more processors, a plurality of applications, and one or more programs. The one or more programs are stored in the memory. When the one or more processors execute the one or more programs, the terminal device is enabled to implement the personalized recommendation method according to the first aspect and the possible implementations of the first aspect.

According to a sixth aspect, a service system is provided. The service system includes a service operation management system, an offline service system, and an online service system. The service operation management system is configured to receive a first service content candidate set. The service operation management system is further configured to send the first service content candidate set to the offline service system. The offline service system is configured to determine label information of service content in the first service content candidate set. The offline service system is further configured to receive a user behavior event sent by the terminal device, and determine a user behavior attribute and user audience group information based on the user behavior event. The offline service system is further configured to send the label information of the service content in the first service content candidate set, the user behavior attribute, and the user audience group information to the online service system. The online service system is configured to receive service content request information sent by the terminal device. The online service system is further configured to determine a second service content candidate set from the first service content candidate set based on the user behavior attribute, the user audience group information, and the label information of the service content in the first service content candidate set. The online service system is further configured to send the second service content candidate set and label information of each piece of service content in the second service content candidate set to the terminal device.

According to a seventh aspect, a personalized recommendation system is provided, including the foregoing terminal device and the foregoing service system.

According to an eighth aspect, a computer storage medium is provided, including instructions. When the instructions are run on an electronic device, the electronic device is enabled to perform the personalized recommendation method according to any one of the foregoing possible implementations.

According to a ninth aspect, a computer program product is provided. When the computer program product is run on an electronic device, the electronic device is enabled to perform the personalized recommendation method according to any one of the foregoing possible implementations.

BRIEF DESCRIPTION OF THE DRAWINGS

FIG. 3A, FIG. 3B, and FIG. 3C are a schematic flowchart of a personalized recommendation method according to an embodiment of this application;

FIG. 4A, FIG. 4B, and FIG. 4C are another schematic flowchart of a personalized recommendation method according to an embodiment of this application;

DETAILED DESCRIPTION OF ILLUSTRATIVE EMBODIMENTS

Figure 1:
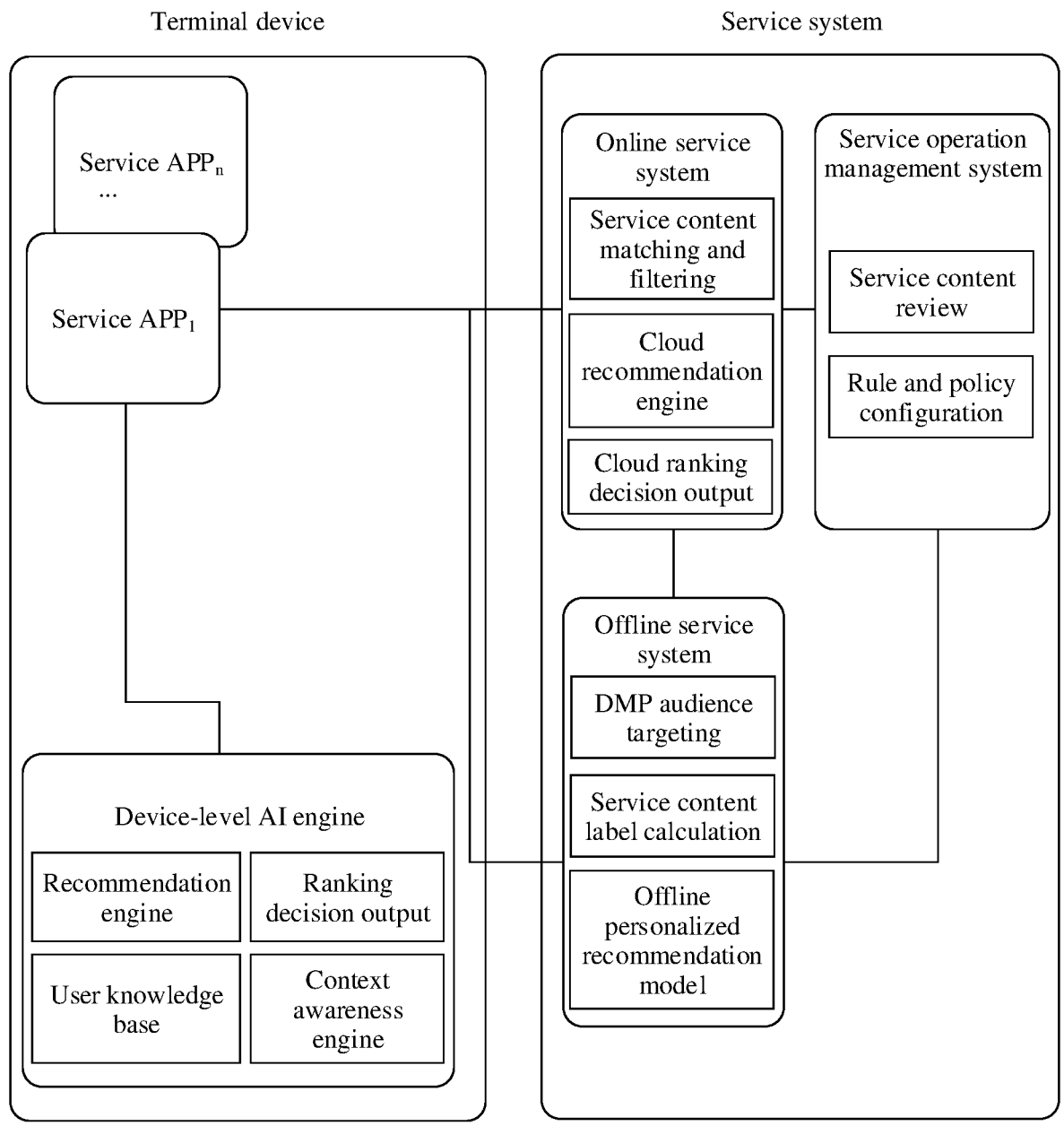
FIG. 1 is a schematic architectural diagram of a personalized recommendation system according to an embodiment of this application.

Terms used in the following embodiments are merely intended to describe specific embodiments, but are not intended to limit this application. Terms "one", "a", "the", "the foregoing", "this", and "the one" of singular forms used in this specification and the appended claims of this application are also intended to include plural forms like "one or more", unless otherwise specified in the context clearly. It should also be understood that, in the following embodiments of this application, "at least one" and "one or more" mean one, two, or more than two. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects.

Reference to "an embodiment", "some embodiments", or the like described in this specification indicates that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean referring to a same embodiment, instead, they mean "one or more but not all of the embodiments", unless otherwise specifically emphasized in other ways. The terms "include", "comprise", "have", and their variants all mean "include but are not limited to", unless otherwise specifically emphasized in other ways.

A terminal device in the embodiments of this application may be a mobile phone, a tablet computer, a wearable device (for example, a smartwatch), a vehicle-mounted device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), or the like. The terminal device in the embodiments of this application may include a touchscreen, configured to present service content to a user. A specific type of the terminal device is not limited in the embodiments of this application.

The service content in the embodiments of this application may be an advertisement, news, a video, music, or the like. A specific type of the service content is not limited in the embodiments of this application.

Before the technical solutions in the embodiments of this application are described, several concepts related to this application are first described.

In fields such as machine learning (machine learning, ML), natural language processing (natural language processing, NLP), and information retrieval (information retrieval, IR), evaluation (evaluation) is necessary work. Evaluation indexes include accuracy (accuracy) and recall (recall), where the accuracy is also referred to as "precision" or a "correct rate", and the recall is also referred to as a "recall rate".

Retrieval is used as an example, and a retrieval status may be represented by using Table 1.

TABLE 1

| | Retrieval status | |
|---|---|---|
| | Related | Unrelated |
| Retrieved | A | B |
| Unretrieved | C | D |

A larger amount of content expected to be retrieved indicates a request for a higher "recall rate", that is, A/(A+C).

A larger amount of really desired, that is, related, content and a smaller amount of unrelated content in content expected to be retrieved indicate a request for higher "accuracy", that is, A/(A+B).

For example, there are 100 emails in a mailbox, and 10 emails are actually junk emails. However, junk email identification software identifies a total of 40 junk emails, where the 10 emails that are actually junk emails are included, and the other 30 emails are mistakenly identified as junk emails. In this case, as shown in Table 1, A is 10, B is 30, and C is 0. Therefore, the recall is 100%, and the correct rate is 25%. Although the recall and the accuracy are not necessarily related to each other (as can be seen from the above formula), the recall and the accuracy are mutually restricted during actual application. A balance needs to be found based on an actual requirement.

FIG. 1 is an architectural diagram of a personalized recommendation system according to an embodiment of this application. As shown in FIG. 1, the personalized recommendation system includes a terminal device and a service system. The terminal device may include a device-level artificial intelligence (artificial intelligence, AI) engine and a terminal-side service application (application, APP). The service system may also be referred to as a cloud-side device, including a cloud-side service operation management system, a cloud-side online service system, and a cloud-side offline service system.

In addition to providing an operation management support capability for service operation personnel, the service operation management system in this embodiment of this application may perform review (automatic review or manual review) on compliance and an admission condition of service content that is finally displayed to a user, and configure a rule and a policy (recommendation algorithm models or manual recommendation rules, weights, priorities, and the like that take effect in different scenarios for different audience groups) that are related to service operation.

The cloud-side online service system processes and responds to a service content request from the terminal device in real time, filters and screens massive cloud-side service content, invokes a personalized recommendation engine of a cloud-side device to perform click-through rate (click through rate, CTR) prediction and ranking decision to output a preliminarily selected service content list and a related parameter to the terminal device, completes a first preliminary selection performed on the service content by the service system, provides a more comprehensive and real-time service content candidate set that may meet a personalized requirement of the user, and focuses on high recall of service content in personalized recommendation.

The cloud-side offline service system focuses on supporting a recommendation decision of the online service system and providing three required key capabilities: service content semantic label processing, audience targeting according to a crowd classification rule, and offline personalized recommendation model calculation. It mainly depends on two types of data sources, where a first type of data source is a service behavior event log that is collected with user consent, and a second type of data source is massive service content data.

A terminal-side device AI engine belongs to a device system-level AI engine and mainly includes a user knowledge base (a basic user attribute, a device attribute, an all-scenario service behavior attribute, and a habit or a preference), a context awareness engine (a user status, an environment, and context), a recommendation engine invoked by a terminal-side service application (application, APP) with user consent, and a ranking decision rule engine. Based on a service content candidate list and service content-related label information that are returned through first cloud-side personalized recommendation, the recommendation engine of the terminal-side AI engine implements more accurate audience matching, secure filtering, and personalized CTR prediction for the second time, and final ranking decision, to filter service content that is inappropriate or invalid for the user. This ensures that service content finally displayed to the user is matched and related. A problem of recommendation accuracy is resolved based on high recall on a cloud side.

The terminal-side service APP is a client carrier whose service capability of a service is configured on the terminal device. The terminal-side service APP requests personalized service content of the service to be displayed to the user, collects related user behavior events, and reports the collected related user behavior events to the terminal-side AI engine and the cloud-side offline service system with user consent, to further update algorithm models that provide optimized service experience.

Figure 2:
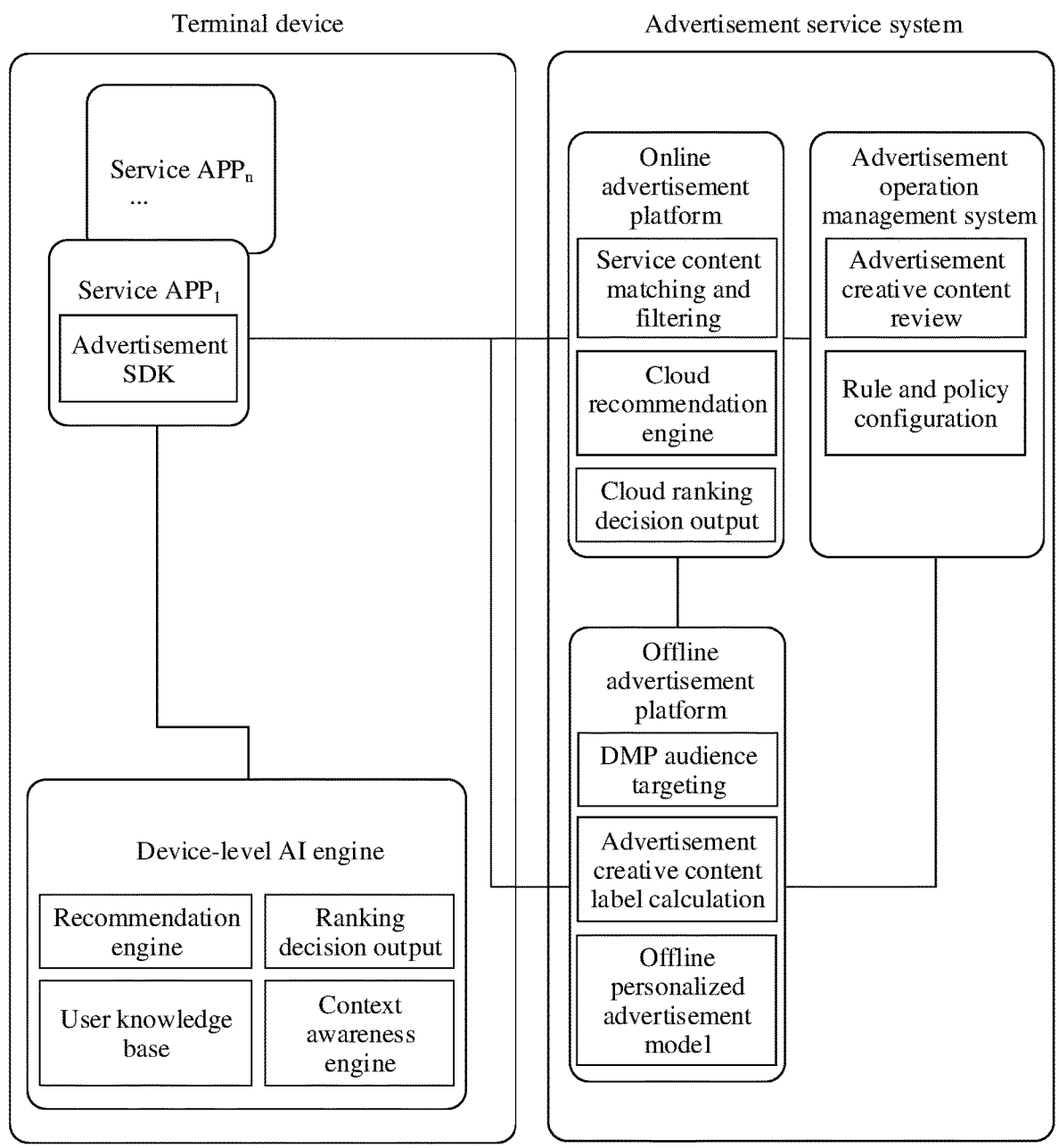
FIG. 2 is another schematic architectural diagram of a personalized recommendation system according to an embodiment of this application.

FIG. 2 is an architectural diagram of a personalized recommendation system according to an embodiment of this application. As shown in FIG. 2, the personalized recommendation system may be applied to an advertisement recommendation scenario, and the personalized recommendation system may be specifically a personalized advertisement recommendation system. The personalized advertisement recommendation system includes a terminal device and a service system. The terminal device may include a device-level AI engine and a terminal-side advertisement software development kit (software development kit, SDK). The service system may also be referred to as a cloud-side device, including an advertisement operation management system, an online advertisement platform, and an offline advertisement platform.

In addition to providing an operation management support capability for advertisement service operation personnel, the advertisement operation management system in this embodiment of this application may perform review (automatic review or manual review) on compliance and an admission condition of advertisement creative content that is finally displayed to a user, and configure a rule and a policy (advertisement recommendation algorithm models or manual recommendation rules, weights, priorities, and the like that take effect in different scenarios for different audience groups) that are related to advertisement service operation.

The online advertisement platform processes and responds to an advertisement request from the terminal device in real time, filters and screens massive advertisement delivery task content, invokes a personalized advertisement recommendation engine of the service system to perform CTR prediction and ranking decision to output a preliminarily selected advertisement creative content list and a related parameter to a terminal side, completes a first preliminary selection performed on the advertisement delivery task content by the service system, provides a more comprehensive and real-time advertisement creative service content candidate set that may meet a personalized requirement of the user, and focuses on high recall of service content in personalized advertisement recommendation.

The offline advertisement platform focuses on supporting a recommendation decision of an online advertisement system and providing three required key capabilities: advertisement creative service content semantic label processing, audience targeting according to a crowd classification rule, and personalized advertisement offline recommendation model calculation. It mainly depends on two types of data sources, where a first type of data source is a service behavior event log and an advertisement user behavior event log that are collected with user consent, and a second type of data source is massive user-unrelated advertisement creative service content data.

The terminal-side device-level AI engine belongs to a device system-level AI engine and mainly includes the following capabilities related to this embodiment of this application: a user knowledge base (a basic user attribute, a device attribute, an all-scenario service behavior attribute, and a habit or a preference), a context awareness engine (a user status, an environment, and context), a recommendation engine invoked by the terminal-side service APP advertisement with user consent, and a ranking decision rule engine. Based on an advertisement creative service content candidate list and advertisement creative service content-related label structured information that are returned through first cloud-side personalized advertisement recommendation, the recommendation engine of the terminal-side AI engine implements more accurate audience matching, secure filtering, and personalized advertisement CTR prediction for the second time, and final ranking decision, to filter advertisement creative service content that is inappropriate or invalid for the user. This ensures that advertisement creative service content finally displayed to the user is matched and related. High personalized advertisement recommendation accuracy is implemented based on high recall on a cloud side.

The terminal-side advertisement SDK can be integrated into a service APP, and is a client carrier whose service capability of an advertisement service is configured on the terminal device. The terminal-side advertisement SDK requests personalized advertisement service content to be displayed to the user, collects related user behavior events and an advertisement event log, and reports the collected related user behavior events and the collected advertisement event log to the terminal-side AI engine and the offline advertisement system to further update algorithm models that provide an optimized personalized advertisement service.

Figure 3A:
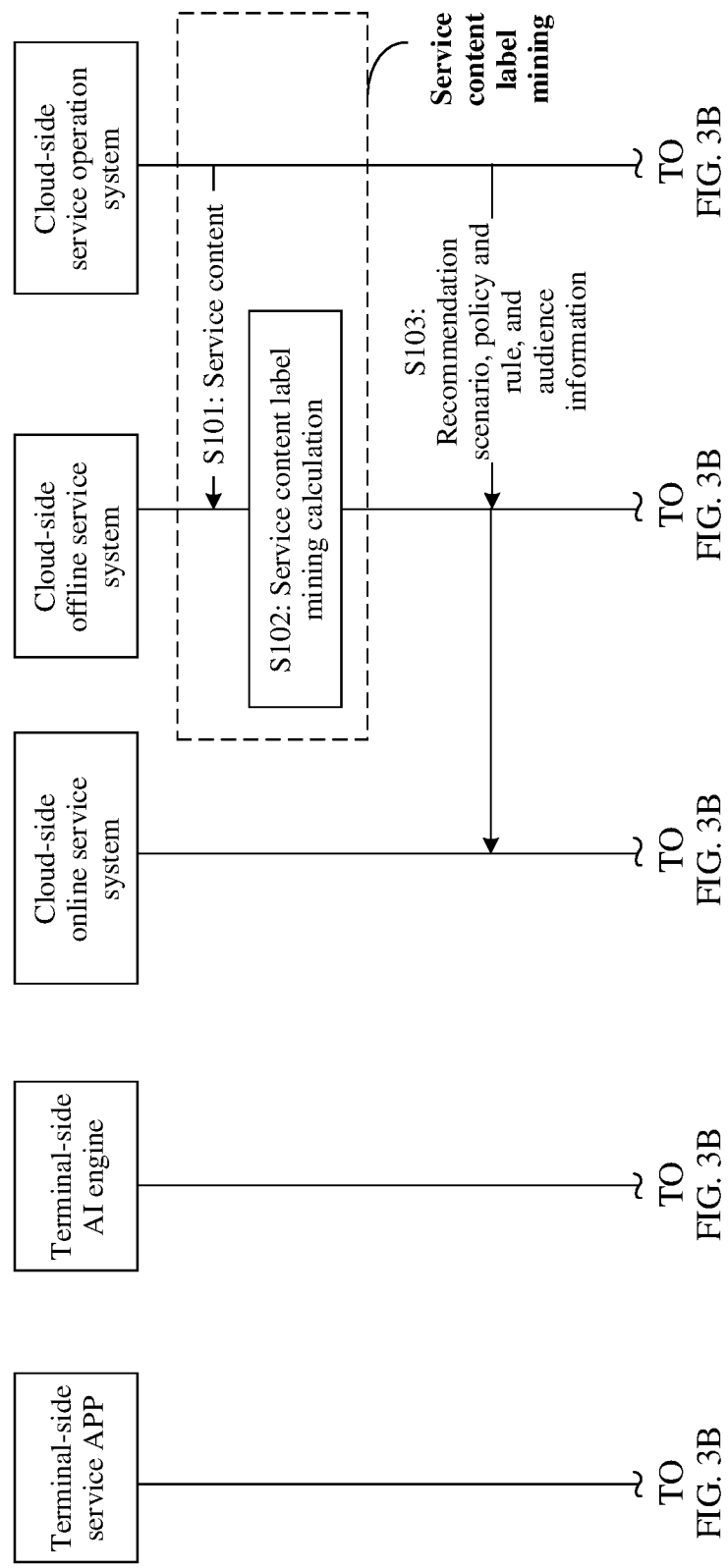
Figure 3C:
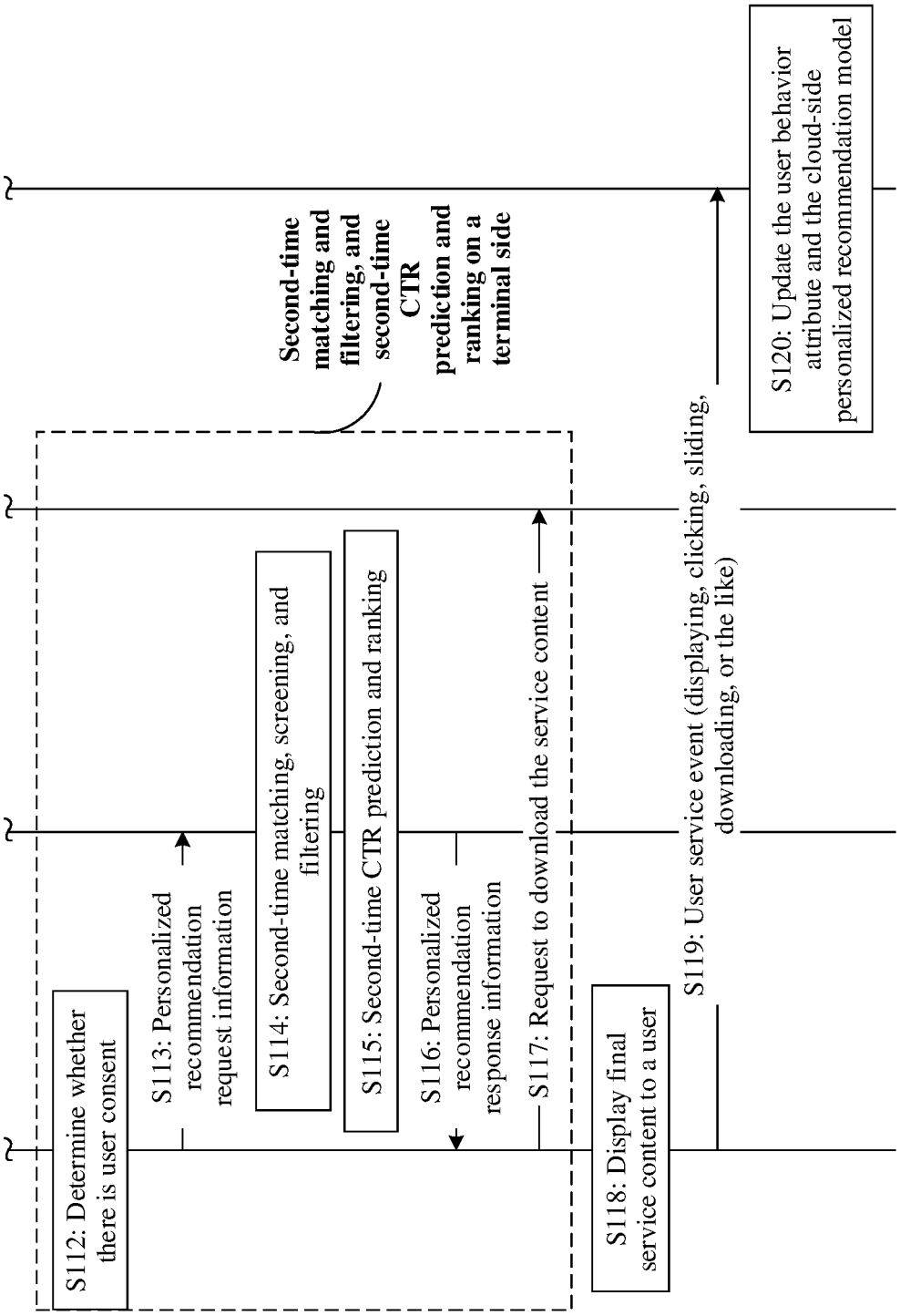

FIG. 3A, FIG. 3B, and FIG. 3C are a schematic flowchart of a personalized recommendation method 100 according to an embodiment of this application. As shown in FIG. 3A, FIG. 3B, and FIG. 3C, the method 100 includes the following steps.

S101: A cloud-side service operation management system imports and uploads service content data in real time or periodically.

Optionally, the service content data includes a text, a picture, a uniform resource locator (uniform resource locator, URL) address, and the like.

For example, an advertiser may import and upload some advertisement creative materials in real time or periodically by using the service operation management system.

In this embodiment of this application, a cloud-side online service system and a cloud-side offline service system are invisible to the advertiser, but the cloud-side service operation management system is visible to the advertiser.

For example, Jingdong promotes a type of computer, and may upload text information, picture information, a URL address, and the like about this type of computer to the cloud-side offline service system in real time by using the service operation management system.

For example, Vipshop promotes a type of makeup product, and may upload text information, picture information, a URL address, and the like about this type of makeup product to the cloud-side offline service system in real time by using the service operation management system.

For example, BMW promotes a type of car, and may upload text information, picture information, a URL address, and the like about this type of car to the cloud-side offline service system in real time by using the service operation management system.

It should be understood that, in this embodiment of this application, the service operation management system may be specifically a cloud-side advertisement operation system, a cloud-side service system may be specifically a cloud-side offline advertisement platform, and the cloud-side online service system may be specifically a cloud-side real-time advertisement platform.

S102: The cloud-side offline service system mines service content through calculation by using a related learning algorithm (for example, a machine learning algorithm or a deep learning algorithm), to generate structured and semantic content labels. These content labels are used for service content matching and filtering and content correlation calculation by the cloud-side online service system and a terminal device.

For example, after receiving the uploaded information about the computer, the cloud-side offline service system may perform label mining calculation on the information about the computer. For example, it is learned through analysis that such a computer is a "notebook computer of an xxx brand", a "game console of an xxx brand", or the like.

For example, after receiving the uploaded information about the makeup product, the cloud-side offline service system may perform label mining calculation on the information about the makeup product. For example, it is learned through analysis that such a makeup product is "lipstick", "perfume", or the like.

For example, after receiving the uploaded information about the car, the cloud-side offline service system may perform label mining calculation on the information about the car. For example, it is learned through analysis that such a car is an "SUV", a "BMW X7", or the like.

By using S101 and S102, the cloud-side offline service system implements label mining on the service content, and provides a basis for subsequent content matching and filtering or content correlation calculation on a cloud side.

S103: The cloud-side service operation management system delivers a personalized recommendation scenario of the service content, a related policy and rule, and audience information supported by the service content to the cloud-side offline service system and the cloud-side online service system. The cloud-side service operation management system is visible to a service content deliverer. The service content deliverer can configure the personalized recommendation scenario of the related service content, the related policy and rule, and the audience information supported by the service content, and deliver these pieces of content to the cloud-side offline service system and the cloud-side online service system by using the cloud-side service operation management system.

For example, each e-commerce platform may deliver an advertisement by using the cloud-side service operation management system, that is, deliver a corresponding advertisement task or creative. A quantity of advertisement tasks or creatives is not limited in this embodiment of this application. In a same time period, thousands of advertisement tasks may be delivered to the cloud-side offline service system (for example, the cloud-side offline advertisement platform) or the cloud-side online service system (or the cloud-side online advertisement platform).

For example, Table 1 shows a group of advertisement delivery tasks based on different audience information.

TABLE 1

Advertisement delivery tasks for different audience information

| Advertiser | Product | Audience information |
|---|---|---|
| Jingdong | Shampoo | Males aged 40 to 50 in second-tier cities |
| | Tablet computer PS4 | Males or females aged 20 to 30 and interested in technologies |
| Vipshop | Lipstick Makeup | Females aged 20 to 30 in Beijing, Shanghai, Guangzhou, and Shenzhen (developed areas) |
| BMW | BMW X7 | Males aged 30 to 50 and interested in cars |
| Honda | Civic Crider | Males aged 20 to 30 and interested in cars |
| BYD | Qin Song | Males aged 20 to 30 and interested in cars |
| Taobao | Mobile phone Smart home appliance | Males or females aged 20 to 30 and interested in technologies |
| | Potato chips | Males or females interested in snacks |

S104: A terminal-side service APP collects a user behavior event with user consent, and reports the collected user behavior event to the offline service system (including a big data platform).

The big data platform in the cloud-side offline service system can store and process the user behavior event reported by the terminal-side service APP.

In this embodiment of this application, the user behavior event includes but is not limited to displaying, clicking, sliding, downloading, or the like.

For example, the terminal device may report some service behavior events of the user in a browser to the cloud-side offline service system.

It should be understood that in S104 in this embodiment of this application, the terminal device may alternatively report some service behavior events of the user in an APP to the service system, provided that these service behavior events are uploaded with user consent.

It should be further understood that the user behavior events may be user behavior events in a previous day or in previous days. This is not limited in this embodiment of this application.

S105: The cloud-side offline service system calculates a user behavior attribute (only a part of data authorized by the user) and audience targeting of the user (based on audience targeting options available on the cloud side), and trains a cloud-side personalized recommendation model.

The cloud-side offline service system can calculate, based on the reported user behavior event, information such as the user behavior attribute and the audience targeting of the user.

For example, 70% of service behavior events reported by the terminal side are that the user searches for "Huawei", "Apple", "Vivo", and the like in the terminal device. In this case, the offline service system can determine that the user behavior attribute is being interested in technologies, and can also determine that audience targeting of the user is young people aged 20 to 30.

For another example, 60% of service behavior events reported by the terminal side are that the user clicks news about a car in a browser. In this case, the offline service system can determine that the user behavior attribute is being interested in cars, and can also determine that audience targeting of the user is a male aged 20 to 50.

For another example, 80% of service behavior events reported by the terminal side are that the user clicks and purchases lipstick, a skincare product, and the like. In this case, the offline service system can determine that the user behavior attribute is being interested in makeup, and can also determine that audience targeting of the user is a female aged 20 to 40.

In addition, the offline service system can update the cloud-side personalized recommendation model based on the reported user behavior event.

S106: The cloud-side offline service system synchronizes the following information to the cloud-side online service system: the user behavior attribute, the service content, the service content-related semantic and structured labels, an audience targeting result, and a trained personalized recommendation model.

After the offline service system calculates the user behavior attribute and the information about the audience targeting of the user by using the related user behavior event, and updates the personalized recommendation model, the offline service system may send the user behavior attribute, the information about the audience targeting of the user, and the personalized recommendation model to the cloud-side online service system.

S107: The cloud-side online service system receives service content request information from the terminal device.

For example, when the user opens a browser, the terminal device is triggered to send the service content request information to the cloud-side online service system to request the service system to perform personalized service content recommendation.

S108: The cloud-side online service system performs matching and filtering on the service content based on the service content request information.

For example, the cloud-side online service system may perform matching and filtering on some advertisements based on the user behavior attribute and the audience targeting result of the user that are obtained through calculation in S105, and different audience group scenario rules used when the advertiser delivers advertisements in S103.

For example, in S105, the user determines that the user is interested in technologies and cars, and the audience targeting is a male aged 20 to 50. For the advertisement tasks shown in Table 1, advertisement content such as "shampoo", "lipstick", "makeup", and "potato chips" may be filtered out.

S109: The cloud-side online service system invokes the cloud-side personalized recommendation algorithm model to perform CTR prediction and result ranking.

The cloud-side online service system may invoke the personalized recommendation algorithm model that is synchronized to the cloud-side online service system in S106 to perform CTR prediction and result ranking on service content obtained after filtering.

It should be understood that for a process in which the cloud-side online service system performs CTR prediction and result ranking on the service content, refer to a method in the conventional technology. This is not limited in this embodiment of this application.

S110: The cloud-side online service system obtains a preliminary selection result of personalized recommendation according to a rule.

The cloud-side online service system may further obtain the preliminary selection result of personalized recommendation according to some preset rules, such as a region rule and a model rule.

It should be understood that a sequence of S109 and S110 is not limited in this embodiment of this application.

It should be further understood that, in this embodiment of this application, the cloud-side online system may further screen, based on two dimensions: the cloud-side personalized recommendation algorithm model and the preset rules, the service content obtained after filtering, to obtain the preliminary selection result of personalized recommendation. Alternatively, the cloud-side online system may screen, based on one of two dimensions: the cloud-side personalized recommendation algorithm model and the preset rules, the service content obtained after filtering, to obtain the preliminary selection result of personalized recommendation. This is not limited in this embodiment of this application.

In this embodiment of this application, the cloud-side online service system may integrate recommendation results in a plurality of algorithms or rules, and output a cloud-side preliminary recommendation result.

In this embodiment of this application, the cloud-side service system mainly implements preliminary selection of personalized recommendation, and finds, based on limited user data on the cloud side, massive service content that may match a user requirement, to implement functions of high-recall one-time screening, CTR prediction, and ranking.

The cloud side has full and real-time service content and a part of user service data collected with user consent. Based on the limited user data, personalized recommendation is performed on the cloud side to find a most complete and real-time service content candidate set that may meet the user requirement, to focus on high recall of recommendation when accuracy of recommendation on the cloud side is low.

S111: The cloud-side online service system sends service content response information to the terminal-side APP. The service content response information includes the preliminary selection result of personalized recommendation: a plurality of service content candidate sets and semantic labels corresponding to the service content candidate sets.

For example, Table 2 shows a preliminary selection result of personalized recommendation that is output by the cloud side. The preliminary selection result of personalized recommendation that is shown in Table 2 is described by using an example in which service content is advertisement creative content.

TABLE 2

Preliminary selection result of personalized recommendation

| Service content candidate set | | Label of the service |
|---|---|---|
| Service content candidate set ID | URL address | content candidate set |
| Connect 1 | Address 1 | Light and thin notebook computer |
| Connect 2 | Address 2 | Beauty mobile phone |
| Connect 3 | Address 3 | German car |
| Connect 4 | Address 4 | Tablet computer |
| Connect 5 | Address 5 | Car from a Japanese enterprise |
| Connect 6 | Address 6 | Smart home appliance |
| Connect 7 | Address 7 | Chinese car |

The plurality of service content candidate sets may include an ID of each piece of service content and a URL address corresponding to each piece of service content.

After obtaining a first recommendation result according to the personalized recommendation algorithm or rule, the cloud-side online service system may also determine a semantic label corresponding to the first recommendation result. For example, the plurality of advertisement tasks shown in Table 2 include a plurality of pictures, and the cloud-side online service system may add corresponding semantic labels to these advertisement tasks based on service content labels mined in S101 and S102.

Different from that in the conventional technology, the first recommendation result delivered by the service system to the terminal device carries the semantic label corresponding to the recommendation result. This can help the terminal device perform screening for the second time. In the conventional technology, the recommendation result delivered by the service system to the terminal device is the final recommendation result, and the recommendation result includes only service content candidate sets. After receiving the service content candidate sets, the terminal device may request corresponding service content from the service system based on URL addresses in the service content candidate sets, to display the corresponding service content to the user.

In this embodiment of this application, when delivering the plurality of service content candidate sets (including the corresponding IDs and URL addresses) to the terminal device, the service system further delivers semantic labels corresponding to the service content. This helps the terminal device perform screening for the second time on the service content that is output by the cloud side, to help improve accuracy of personalized recommendation.

According to the personalized recommendation method in this embodiment of this application, advantages of comprehensiveness and accuracy of user data in the terminal device can be fully exerted; no additional user data or label needs to be uploaded, but only secure filtering and accurate matching need to be performed in a downstream direction, to obtain service content that meets a user requirement. In this way, on a basis of high recall of service content in one-time advertisement recommendation of the service system, in combination with the data advantages of the terminal device, accuracy of personalized recommendation is high. High-recall and high-accuracy personalized recommendation service experience is provided through cooperation between two times of personalized recommendation based on device-cloud collaboration.

Optionally, the preliminary selection result of personalized recommendation that is output by the cloud-side service system may further include audience information and/or a delivery price of the service content.

For example, Table 3 shows another preliminary selection result of personalized recommendation that is output by the cloud side. The preliminary selection result of personalized recommendation that is shown in Table 3 is described by using an example in which service content is advertisement creative content.

TABLE 3

Preliminary selection result of personalized recommendation

| Service content candidate set ID | URL address | Label of the service content candidate set | Audience information | Delivery price |
|---|---|---|---|---|
| Connect 1 | Address 1 | Light and thin notebook computer | Females aged 20 to 40 and interested in technologies | 5 yuan |
| Connect 2 | Address 2 | Beauty mobile phone | Females aged 20 to 30 and interested in technologies | 3 yuan |
| Connect 3 | Address 3 | German car | Males aged 30 to 50 and interested in technologies | 15 yuan |
| Connect 4 | Address 4 | Tablet computer | Males or females aged 20 to 30 and interested in technologies | 4 yuan |
| Connect 5 | Address 5 | Car from a Japanese enterprise | Males aged 30 to 40 and interested in cars | 10 yuan |
| Connect 6 | Address 6 | Smart home appliance | Males or females aged 20 to 30 and interested in technologies | 5 yuan |
| Connect 7 | Address 7 | Chinese car | Males aged 20 to 30 and interested in cars | 10 yuan |

S112: The terminal-side APP determines whether the user authorizes the terminal-side APP to invoke a terminal-side AI engine.

With user consent, the terminal-side APP can invoke the terminal-side AI engine to implement security filtering of service content and configuration of a final decision for second-time personalized recommendation.

S113: With user consent, the terminal-side APP sends personalized recommendation request information to the terminal-side AI engine. The personalized recommendation request information includes a plurality of service content candidate sets and semantic labels corresponding to the service content candidate sets.

The terminal-side APP may send, to the terminal-side AI engine, the plurality of service content candidate sets including the service content that is output by the cloud-side online service system and the labels of the service content candidate sets, and request the AI engine to perform second-time personalized recommendation for the preliminary selection result of personalized recommendation.

For example, the terminal-side APP may send an ID corresponding to the service content and a corresponding semantic label to the terminal-side AI engine. Optionally, when the preliminary selection result of personalized recommendation that is output by the cloud-side online service system includes the audience information and the delivery price, the terminal-side APP may send the ID corresponding to the service content, the corresponding semantic label, the audience information, and the delivery price to the terminal-side AI engine.

S114: The terminal-side AI engine performs second-time matching, screening, and filtering on the service content in the preliminary selection result of personalized recommendation based on the plurality of input service content candidate sets with reference to user-related information.

The terminal-side AI engine mainly includes the user knowledge base that has the most comprehensive and accurate user data and attributes, a context awareness engine that senses contexts and environments in real time, and a terminal-side personalized recommendation engine.

The context awareness engine is mainly used for calculation and input. A current real-time status parameter of the user on the terminal side is finally used as an input parameter and sent to the terminal-side personalized recommendation engine.

The terminal-side AI engine has the user knowledge base that includes the most comprehensive and accurate user data and the context awareness engine that senses the contexts and the environments in real time. Therefore, the terminal-side AI engine can filter and screen recommendation results sent by the terminal-side APP.

For example, the terminal-side AI engine may calculate a correlation coefficient based on the recommendation results and the user knowledge base.

For example, the user knowledge base includes user attribute features such as a gender, an age, an interest, a blog post feature, a following user feature, location based service (location based service, LBS) location information (that is, a real-time location), an education background, an occupation, a family, and a consumption level. The terminal-side AI engine may calculate correlation coefficients with service content Connect 1 to Connect 7 based on these user attribute features.

For example, if information included in the user knowledge base is as follows: for a user, the age is between 20 and 30, the gender is male, the annual consumption amount is 50,000 to 80,000, and the interest is technology products, a correlation coefficient shown in Table 4 may be obtained through calculation by using a specific preset condition.

TABLE 4

| ID | Label of service content | Correlation coefficient |
|---|---|---|
| 1 | Light and thin notebook computer | 0.4 |
| 2 | Beauty mobile phone | 0.5 |
| 3 | German car | 0.1 |
| 4 | Tablet computer | 0.6 |
| 5 | Car from a Japanese enterprise | 0.2 |
| 6 | Smart home appliance | 0.6 |
| 7 | Chinese car | 0.3 |

It can be learned from Table 4 that correlation coefficients that can be output by the terminal-side AI engine are ranked in the following descending order: "tablet computer", "smart home appliance", "beauty mobile phone", "thin and light notebook computer", "Chinese car", "car from a Japanese enterprise", and "German car".

In a possible implementation, when the first recommendation result includes the delivery price, a commercialization factor may be also considered, and the delivery price may be also considered during calculation of a correlation coefficient.

For example, Table 5 shows a correlation coefficient calculation result.

TABLE 5

| ID | Label of service content | Correlation coefficient |
|---|---|---|
| 1 | Light and thin notebook computer | 0.4 × 5 = 2 |
| 2 | Beauty mobile phone | 0.5 × 3 = 1.5 |
| 3 | German car | 0.1 × 15 = 1.5 |
| 4 | Tablet computer | 0.6 × 4 = 2.4 |
| 5 | Car from a Japanese enterprise | 0.2 × 10 = 2 |
| 6 | Smart home appliance | 0.6 × 5 = 3 |
| 7 | Chinese car | 0.3 × 10 = 3 |

It can be learned from Table 5 that, when the commercialization factor is considered, correlation coefficients that can be output by the terminal-side AI engine are ranked in the following descending order: "smart home appliance", "Chinese car", "tablet computer", "light and thin notebook computer", "car from a Japanese enterprise", "beauty mobile phone", and "German car".

S115: The terminal-side AI engine invokes an algorithm model of the terminal-side personalized recommendation engine to perform second-time CTR prediction and ranking to implement final selection of personalized recommendation, and implement final decision to output secure, accurate, and personalized recommendation service content that matches a terminal-side user requirement.

The CTR prediction is one of the most core algorithms during advertisement calculation, and the CTR prediction is used to predict a click status of each advertisement, that is, to predict whether a user clicks or does not click. The CTR prediction is related to many factors such as a historical click-through rate, an advertisement location, time, and a user. The algorithm model of the personalized recommendation engine is a model that is trained based on a large amount of historical data by comprehensively considering various factors and features. A training sample for the CTR prediction is usually obtained from a historical log (log) or an offline feature database. A sample label is relatively easy to be obtained. A user-clicking mark is 1, and a non-clicking mark is 0. Many features are considered, such as a demographic feature of a user, an advertisement feature, and an advertisement display feature. Among these features, many category features are used, such as a user occupation and an advertisement display IP address. Usually, one-hot code is sampled for category features. For example, there are three occupations: student, white-collar worker, and worker, which are respectively represented by using vectors with the length of 3, that is, [1, 0, 0], [0, 1, 0], and [0, 0, 1]. In this way, a feature dimension is greatly expanded, and the features are very sparse. Currently, many companies have hundreds of millions of advertisement feature databases.

In this embodiment of this application, the ranking may be effective cost per mille (effective cost per mile, eCPM) ranking. The eCPM is advertisement revenue that can be obtained every 1000 displays. A display unit may be a web page, an advertisement unit, or the like. Based on the ePCM, the advertiser can analyze advertisement delivery effects and optimize and adjust an advertisement accordingly, to increase revenue.

It should be understood that, in this embodiment of this application, if the terminal-side AI engine determines, through second-time screening by the terminal-side AI engine in S114 and S115, that advertisement tasks of Connect 1 to Connect 7 each do not meet a preference of the user or are an advertisement whose content is offensive for the user, the terminal-side AI engine can filter out these advertisement tasks and notify the terminal-side APP not to display any advertisement content.

According to the personalized recommendation method in this embodiment of this application, advantages of comprehensiveness and accuracy of user data in the terminal device can be fully exerted; no additional user data or label needs to be uploaded, but only secure filtering and accurate matching need to be performed in a downstream direction, to obtain service content that meets a user requirement. In this way, on a basis of high recall of service content in one-time recommendation of the service system, in combination with the data advantages of the terminal device, accuracy of personalized recommendation is high. High-recall and high-accuracy personalized recommendation service experience is provided through cooperation between two times of personalized recommendation based on device-cloud collaboration.

S116: The terminal-side AI engine sends personalized recommendation response information to the terminal-side APP. The personalized recommendation response information includes a list of service content that finally meets the user requirement.

The terminal-side AI engine may send, to the terminal-side APP, a second recommendation result obtained according to the algorithm model of the terminal-side personalized recommendation engine in S115.

For example, the terminal-side AI engine may select IDs of service content ranking top two in a prediction result, and send the IDs to the terminal-side APP.

For example, the terminal-side AI engine determines that IDs of service content that is output through second-time prediction and ranking are Connect 4 and Connect 6.

S117: The terminal-side APP downloads service content data from the cloud-side online service system to the terminal-side APP based on the service content list displayed through final decision.

After receiving an ID of service content that is output by the terminal-side AI engine through final recommendation decision, the terminal-side APP downloads, from the cloud-side online service system to the terminal-side APP based on a URL address corresponding to the ID, the service content that is output through the final recommendation decision.

For example, after receiving the top two IDs (Connect 4 and Connect 6) output through the second-time prediction and ranking, the terminal-side APP requests, based on a URL address 4 and a URL address 6, the cloud-side online service system to download "smart home appliance" and "tablet computer" related advertisement tasks.

S118: The terminal-side APP outputs and displays final service content to the user.

After receiving the final personalized service content, the terminal-side APP displays the service content to the user.

For example, the two advertisement tasks of "smart home appliance" and "tablet computer" are displayed in a browser interface of the user.

S119: The terminal-side APP reports the user service operation behavior event collected with user consent to the cloud-side offline service system, and the terminal-side AI engine locally stores the event.

It should be understood that for S119, refer to the process of S104. For brevity, details are not described herein again.

S120: The cloud-side offline service system updates the user behavior attribute and the cloud-side personalized recommendation model in real time.

The terminal-side APP can upload user service behavior events of the two advertisement tasks of "smart home appliance" and "tablet computer" to the cloud-side offline service system. The terminal-side AI engine can update the user knowledge base. The cloud-side offline service system can calculate a part of user behavior attributes and user audience targeting, and update the cloud-side personalized recommendation model.

In this embodiment of this application, differentiated advantages of respective data of the terminal side and the cloud side are fully exerted through two times of personalized recommendation algorithm modeling with device-cloud collaboration and different focuses. Selections of algorithms and feature sets for the two times of personalized recommendation algorithm modeling are independent of each other. Only an input of a personalized recommendation candidate set of the terminal device depends on an output of a personalized recommendation result of the service system.

The terminal device has complete user knowledge base data, but the terminal-side APP does not store service content or stores only incomplete and non-real-time partial service content. Therefore, on a basis that a terminal-side personalized recommendation algorithm model needs to find a plurality of candidate sets of more complete service content based on high recall of cloud-side one-time recommendation, advantages of high quality and integrity of local user data in the terminal device are fully exerted. This focuses on implementing high accuracy of recommendation.

In a matching, screening, and filtering process for improving a correlation between service content and the user, mining calculation (real-time increment and full amount) on a semantic and structured content label of the service content is performed on the cloud side in a unified manner. Therefore, in addition to implementing rule matching and filtering on the service content and a user service attribute by using a label of the service content in a cloud-side personalized recommendation process, the service content candidate set list that is output through cloud-side one-time recommendation and that is sent to the terminal-side APP may further include the semantic label corresponding to the service content candidate set. All the information is sent to the terminal-side APP to further perform matching and filtering on the terminal side with reference to the data in the user knowledge base on the terminal side and the content label.

A mobile advertisement is used as one of key components of user consumption information service content, and it also needs to put forward higher requirements for promotion of the mobile advertisement. An ultimate goal of the mobile advertisement should be "advertisement as a service", and advertisement service content provided for the user is service content required by the user, rather than harassing information. Therefore, long-term sustained goals of a sustainable and well-developed service include accurately and deeply understanding user requirements, providing high-quality native content that meets the user requirements, and promoting service content. In addition, user privacy protection laws and regulations need to be strictly guaranteed and enforced. User personal data is properly used within legal compliance, to provide better accurate personalized recommendation service experience.

Figure 4B:
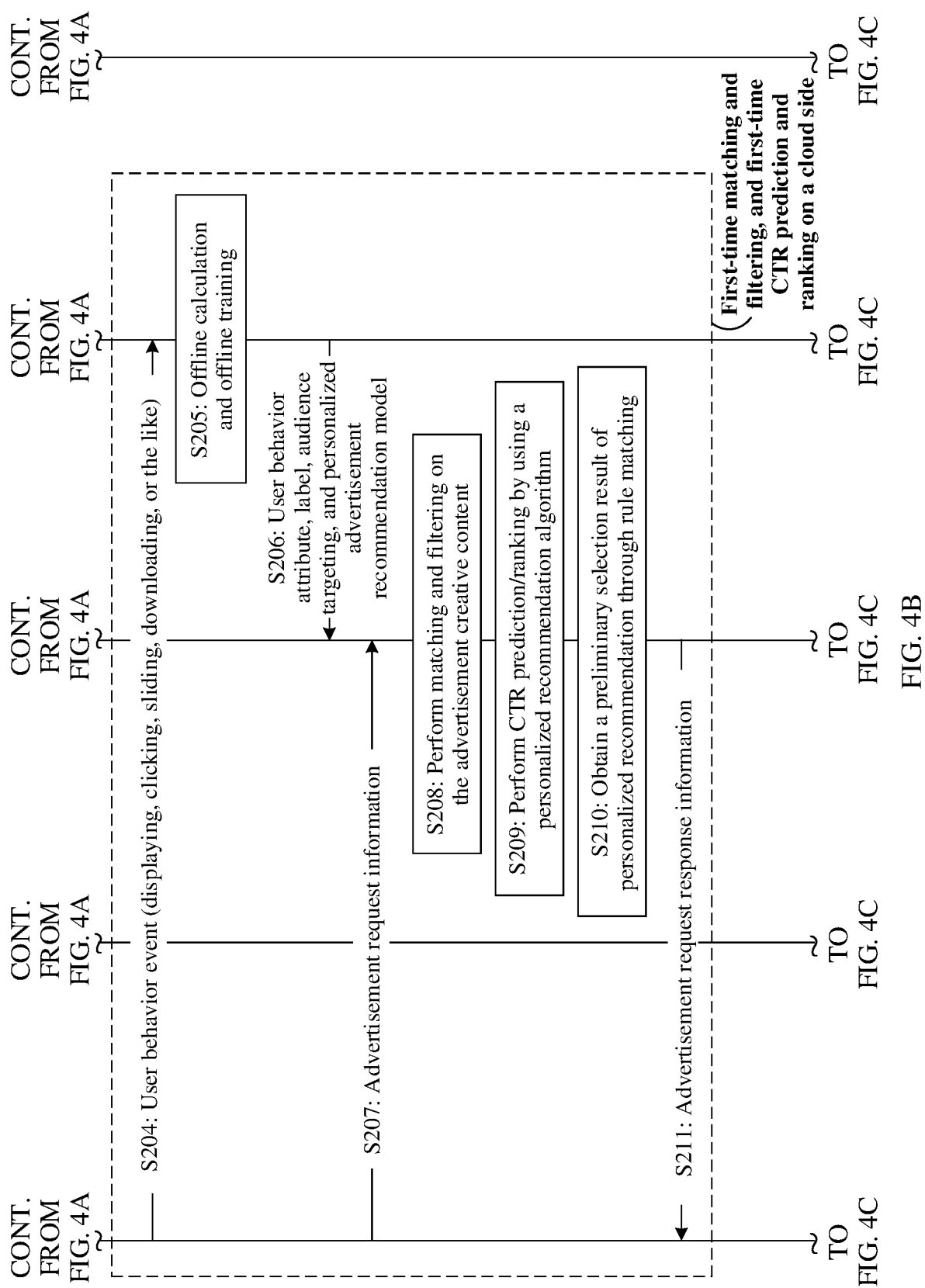
Figure 4C:
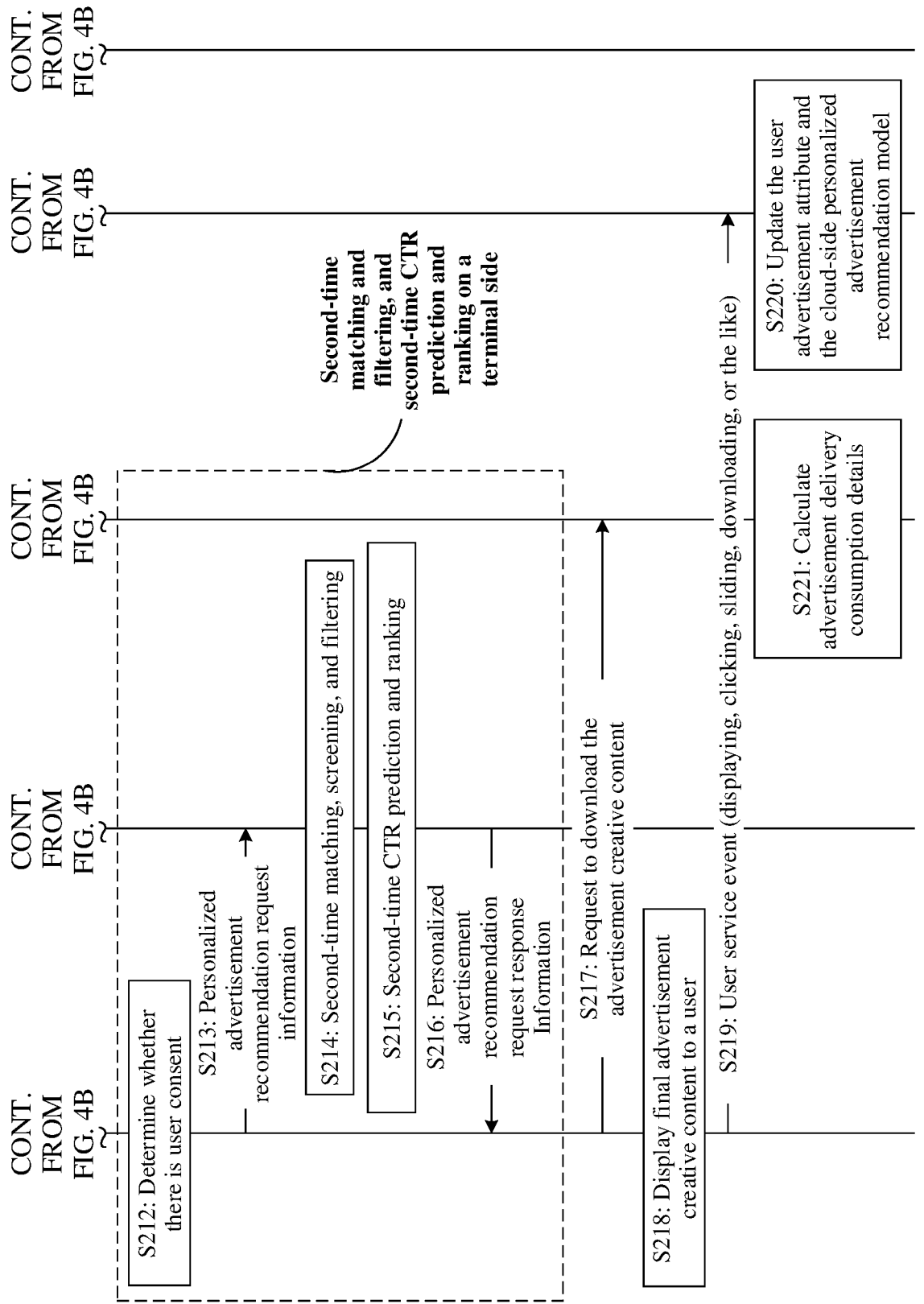

FIG. 4A, FIG. 4B, and FIG. 4C are a schematic flowchart of a personalized recommendation method 200 according to an embodiment of this application. The method 200 may be applied to an advertisement recommendation scenario. As shown in FIG. 4A, FIG. 4B, and FIG. 4C, the method 200 includes the following steps.

S201: A cloud-side advertisement operation system imports and uploads massive advertisement creative content in real time or periodically.

S202: A cloud-side offline advertisement platform mines advertisement creative service content through calculation by using a related learning algorithm (for example, a machine learning algorithm or a deep learning algorithm), to generate structured and semantic content labels. These content labels are used for advertisement creative content matching and filtering and content correlation calculation by a cloud-side online service system and a terminal device.

S203: The cloud-side advertisement operation system delivers a personalized recommendation scenario of the advertisement creative content, a related policy and rule, and audience information supported by the service content to the cloud-side offline advertisement platform and the cloud-side online advertisement platform.

The cloud-side advertisement operation system is visible to an advertiser. The advertiser can configure a related policy and rule for a personalized recommendation scenario of a related advertisement and audience information about advertisement creative content, and deliver these pieces of content to the cloud-side offline advertisement platform and the cloud-side online advertisement platform through the cloud-side advertisement operation system.

Based on the cloud-side advertisement operation system, advertisement service operation personnel configure the related policy and rule for the related personalized recommendation scenario to support different scenarios and audience information. A combination of different personalized advertisement recommendation algorithms is used, and matching and filtering rules for content correlation and exclusiveness are supported. In addition, the advertiser also defines, in the cloud-side advertisement operation system (a delivery platform for the advertiser), audience information (or a related audience group rule) specified by a related delivery task. Two types of policies are delivered to the cloud-side offline advertisement platform and cloud-side online advertisement platform.

S204: A terminal-side service APP collects a user behavior event with user consent, and reports the collected user behavior event to the cloud-side offline advertisement platform (including a big data platform).

The big data platform in the cloud-side offline advertisement platform can store and process the user behavior event reported by the terminal-side service APP.

In this embodiment of this application, the user behavior event includes but is not limited to displaying, clicking, sliding, downloading, or the like.

S205: The cloud-side offline advertisement platform calculates a user behavior attribute (only a part of data authorized by a user) and an audience group of the user (based on audience targeting options available on a cloud side), and trains a cloud-side personalized recommendation model.

For example, based on a part of data that is reported by the terminal device and that is authorized by the user, the big data platform in the cloud-side offline advertisement platform calculates the user behavior attribute and audience targeting of the user, and updates a cloud-side personalized advertisement recommendation model.

Because limited user service behavior events on the cloud side are used as an input, audience targeting information calculated by the cloud-side offline advertisement platform is inaccurate, and accuracy of the cloud-side personalized recommendation model is low.

It should be understood that for S205, refer to the description of S105. For brevity, details are not described herein again.

S206: The cloud-side offline advertisement platform synchronizes the following information to the cloud-side online advertisement platform: the user behavior attribute, the service content, the service content-related semantic and structured labels, an audience targeting result, and a trained personalized advertisement recommendation model.

It should be understood that for S206, refer to the description of S106. For brevity, details are not described herein again.

S207: The cloud-side online advertisement platform receives advertisement request information from an advertisement SDK of a terminal-side APP.

For example, when the user opens a browser, the terminal device is triggered to send an advertisement request to the cloud-side online advertisement platform.

S208: The cloud-side online advertisement platform performs matching and filtering on the advertisement creative content.

The cloud-side online advertisement platform performs matching and filtering on delivered advertisement creative content based on a related scenario, advertisement request parameters, the user behavior attribute, and the audience targeting result.

For a process of screening the advertisement creative content by the cloud-side online advertisement platform, refer to the example in S108. For brevity, details are not described herein again.

S209: The cloud-side online advertisement platform invokes a cloud-side personalized recommendation algorithm model to perform CTR prediction and result ranking.

The cloud-side online advertisement platform may invoke the personalized recommendation model that is synchronized to the cloud-side online advertisement platform in S206 to perform CTR prediction and result ranking on advertisement creative content obtained after filtering.

S210: The cloud-side online advertisement platform obtains a preliminary selection result of personalized recommendation according to a rule.

It should be understood that a sequence of S209 and S210 is not limited in this embodiment of this application.

The cloud-side online advertisement platform may further screen, according to some preset rules such as a region rule and a model rule, the advertisement creative content obtained after filtering, to obtain the preliminary selection result of personalized recommendation.

In this embodiment of this application, the advertisement service system mainly implements preliminary selection of personalized recommendation, and finds, based on limited user data (including user advertisement behavior data) on the cloud side, massive advertisement creative content that may match a user requirement, to implement functions of high-recall one-time screening, recommendation CTR prediction, and ranking.

S211: The cloud-side online advertisement platform sends advertisement request response information to the advertisement SDK. The advertisement request response information includes the preliminary selection result of personalized recommendation.

The preliminary selection result of personalized recommendation includes but is not limited to: a plurality of advertisement creative content candidate sets, semantic and structured labels of the advertisement creative content, real-time advertisement bidding information, or the like. It should be understood that, for the preliminary selection result of personalized recommendation, refer to Table 2 or Table 3. For brevity, details are not described herein again.

Different from that in the conventional technology, a first recommendation result delivered by the advertisement service system to the terminal device carries the semantic label corresponding to the advertisement creative content. This can help the terminal device perform screening for the second time. In the conventional technology, a recommendation result delivered by the advertisement service system to the terminal device is a final recommendation result, and the recommendation result includes only advertisement creative content candidate sets. After receiving the advertisement creative content candidate sets, the terminal device may request corresponding advertisement creative content from the service system based on URL addresses in the advertisement creative content candidate sets, to display the corresponding advertisement creative content to the user.

In this embodiment of this application, when delivering the plurality of advertisement creative content candidate sets (including corresponding IDs and URL addresses) to the terminal device, the service system further delivers semantic labels corresponding to the service content. This helps the terminal device perform screening for the second time on the service content that is output by the cloud side, to help improve accuracy of personalized recommendation.

According to the personalized recommendation method in this embodiment of this application, advantages of comprehensiveness and accuracy of user data in the terminal device can be fully exerted; no additional user data or label needs to be uploaded, but only secure filtering and accurate matching need to be performed in a downstream direction, to obtain advertisement creative content that meets a user requirement. In this way, on a basis of high recall of advertisement creative content in one-time advertisement recommendation of the service system, in combination with the data advantages of the terminal device, accuracy of personalized recommendation is high. High-recall and high-accuracy personalized recommendation service experience is provided through cooperation between two times of personalized recommendation based on device-cloud collaboration.

S212: The advertisement SDK determines whether the user authorizes invoking of a terminal-side AI engine.

When the advertisement SDK determines that the user authorizes invoking of the terminal-side AI engine, the advertisement SDK invokes the terminal-side AI engine to implement secure filtering of advertisement creative content and second-time personalized recommendation decision.

S213: With user consent, the advertisement SDK sends personalized advertisement recommendation request information to the terminal-side AI engine. The personalized recommendation request information includes the preliminary selection result of personalized recommendation that is output by the cloud-side online advertisement platform.

In an embodiment, the advertisement SDK may further send a delivery price (or bidding information) to the terminal-side AI engine.

S214: The terminal-side AI engine performs second-time matching, screening, and filtering on advertisement creative content in the preliminary selection result of personalized recommendation based on the input advertisement creative content candidate sets with reference to user-related information.

It should be understood that, for a process in which the terminal-side AI engine performs matching, screening, and filtering on the advertisement creative content with reference to user-related data, refer to the description in S114. For brevity, details are not described herein again.

S215: The terminal-side AI engine invokes an algorithm model of a terminal-side personalized recommendation engine to perform second-time CTR prediction and ranking to implement final selection of personalized recommendation, and final decision to output secure, accurate, and personalized advertisement creative content that matches a terminal-side user requirement.

According to the personalized recommendation method in this embodiment of this application, advantages of comprehensiveness and accuracy of user data stored in the terminal device can be fully exerted; no additional user data or label needs to be uploaded, but only secure filtering and accurate matching need to be performed in a downstream direction, to obtain advertisement creative service content that meets a user requirement. In this way, on a basis of high recall of service content in one-time advertisement recommendation of the advertisement service system, in combination with the user data advantages of the terminal device, accuracy of personalized advertisement recommendation is high. High-recall and high-accuracy personalized advertisement recommendation service experience is provided through cooperation between two times of personalized advertisement recommendation based on device-cloud collaboration.

S216: The terminal-side AI engine sends personalized advertisement recommendation request response information to the advertisement SDK. The personalized advertisement recommendation request response information includes a list of advertisement creative content that finally meets the user requirement.

S217: The advertisement SDK downloads advertisement creative content data from the cloud side to the terminal-side APP based on the finally determined advertisement creative content list.

S218: The advertisement SDK outputs and displays final personalized advertisement creative content to the user.

S219: The advertisement SDK collects a user behavior event with user consent, and reports the collected user behavior event to the cloud-side online advertisement platform.

S220: The cloud-side offline advertisement platform updates a user advertisement attribute and the cloud-side personalized advertisement recommendation model in real time.

It should be understood that for descriptions in S216 to S220, refer to descriptions in S116 to S120.

The advertisement SDK may further report user behavior time to the terminal-side AI engine. The terminal-side AI engine may update the user data and related attributes in the user knowledge base in real time.

For example, the method 200 further includes:

S221: The cloud-side online advertisement platform calculates advertisement delivery consumption details.

According to the personalized recommendation method in this embodiment of this application, based on high recall of a one-time advertisement recommendation algorithm model on the cloud side, in combination with the data advantages on the terminal side, band security and high accuracy of personalized advertisement recommendation are implemented. High-recall and high-accuracy personalized advertisement recommendation experience is provided through cooperation between two times of personalized recommendation based on device-cloud collaboration.

Differentiated advantages of respective data of the terminal side and the cloud side are fully exerted through two times of personalized advertisement recommendation algorithm modeling with device-cloud collaboration and different focuses. Selections of algorithms and feature sets for the two times of personalized advertisement recommendation algorithm modeling are independent of each other. Only an input of a terminal-side personalized advertisement recommendation candidate set depends on an output of a cloud-side personalized advertisement recommendation candidate set list. Compared with a device-cloud collaboration recommendation method in the conventional technology, the personalized recommendation method in the embodiments of this application helps resolve a problem that audience targeting accuracy is low due to cloud-side data quality and integrity problems, and exert respective data advantages with device-cloud collaboration, to form complete audience targeting collaboration.

The cloud side has full/real-time advertisement delivery tasks and creative service content, partial user service data collected with user consent, and a user advertisement behavior event. Based on the limited user service data, personalized advertisement recommendation algorithm modeling is performed on the cloud side to find a most complete and real-time advertisement service content candidate set that may meet the user requirement, to focus on high recall of advertisement recommendation when recommendation accuracy is low.

The terminal side has complete user knowledge base data, but a terminal-side service does not store service content or stores only incomplete and non-real-time service content. Therefore, on a basis that a terminal-side personalized advertisement recommendation algorithm model needs to return a plurality of advertisement creative service content candidate sets based on high recall of cloud-side one-time advertisement recommendation, advantages of high quality and integrity of local user data on the terminal side are fully exerted. This focuses on implementing high accuracy of final advertisement recommendation. Compared with a recommendation method based on only the terminal side in the conventional technology, the personalized recommendation method in the embodiments of this application helps resolve a problem that by independently depending on a terminal-side recommendation algorithm model and data, only a problem in a scenario with limited terminal-side local content recommendation can be resolved, but massive, rich, and accurate cloud-side service content cannot be obtained. In addition, the personalized recommendation method in the embodiments of this application further helps resolve a problem that in a cloud-side recommendation algorithm model, recommendation result accuracy is low due to the quality and integrity problems of the data on the cloud side, especially resolve a content security sensitivity problem (the content is inappropriate for users). This ensures user privacy security and provides more accurate personalized recommendation user experience.

In a matching, screening, and filtering process for improving a correlation between advertisement creative service content and the user, mining calculation (real-time increment and full amount) on a semantic and structured content label of the advertisement creative service content is performed on the cloud side in a unified manner. Therefore, in addition to implementing rule matching and filtering on the creative content and a user service attribute by using a label of the advertisement creative service content in a cloud-side personalized advertisement recommendation process, the creative service content candidate set list that is output through cloud-side one-time advertisement recommendation and that is sent to the terminal-side advertisement SDK may further include the label corresponding to the advertisement creative service content candidate set. All the information is sent to the terminal-side advertisement SDK to further perform matching and filtering with reference to the data in the user knowledge base on the terminal side and the advertisement creative content label.

It should be understood that the same design principle and process of accurate personalized recommendation with device-cloud collaboration are applicable to an accurate personalized recommendation application scenario in the service system and an accurate personalized recommendation scenario in the advertisement system.

It should be further understood that, in the embodiments of this application, the service content may be a video service, an advertisement service, a news service, or the like. In the foregoing method 200, only the advertisement service is used as an example for description. A specific form of the service content is not limited in the embodiments of this application.

The foregoing describes the personalized recommendation method provided in the embodiments of this application. The following describes a terminal device, a service system, and a personalized recommendation system provided in the embodiments of this application.

Figure 5:
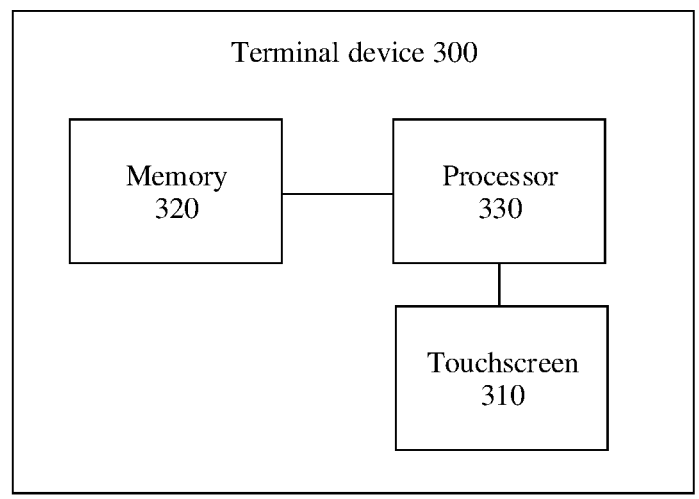
FIG. 5 is a schematic block diagram of a terminal device according to an embodiment of this application.

FIG. 5 is a schematic structural diagram of a terminal device 300 according to an embodiment of this application. As shown in FIG. 5, the terminal device 300 includes a touchscreen 310, a memory 320, and a processor 330. One or more computer programs are stored in the memory 320, and the one or more computer programs include instructions. When the instructions are executed by the processor 330, the terminal device 300 is enabled to perform the following operations:
  sending service content request information to a service system;
  receiving service content response information sent by the service system, where the service content response information includes a service content candidate set, the service content candidate set includes a plurality of pieces of service content, and the service content candidate set is obtained by the service system based on a user behavior event reported by the terminal device;
  determining one or more pieces of service content from the service content candidate set based on user-authorized data; and
  displaying the one or more pieces of service content to a user by using the touchscreen 310.

Optionally, the service content response information further includes label information of each piece of service content in the service content candidate set. When the instructions are executed by the processor 330, the terminal device 300 is enabled to perform the following operations:
  determining the one or more pieces of service content based on the user-authorized data and the label information of each piece of service content in the service content candidate set.

Optionally, when the instructions are executed by the processor 330, the terminal device 300 is enabled to perform the following operations:
  determining, based on the user-authorized data and the label information of each piece of service content, a correlation coefficient between each piece of service content and the user-authorized data; and determining the one or more pieces of service content based on the correlation coefficient.

Optionally, when the instructions are executed by the processor 330, the terminal device 300 is enabled to perform the following operations:
  determining a plurality of correlation coefficients based on the user-authorized data and the label information of each of the plurality of pieces of service content; and
  displaying, to the user by using the touchscreen, service content corresponding to a correlation coefficient that is greater than or equal to a preset value among the plurality of correlation coefficients.

Optionally, the service content is massive service content that is of the service system and that is with real-time update.

Optionally, the service content includes one or more of an advertisement service, a video service, or a news service.

It should be understood that the terminal device 300 may correspond to the terminal device in the personalized recommendation method 100 or 200, and the processor 330 may be configured to perform operations of the terminal device in the method 100 or 200.

Figure 6:
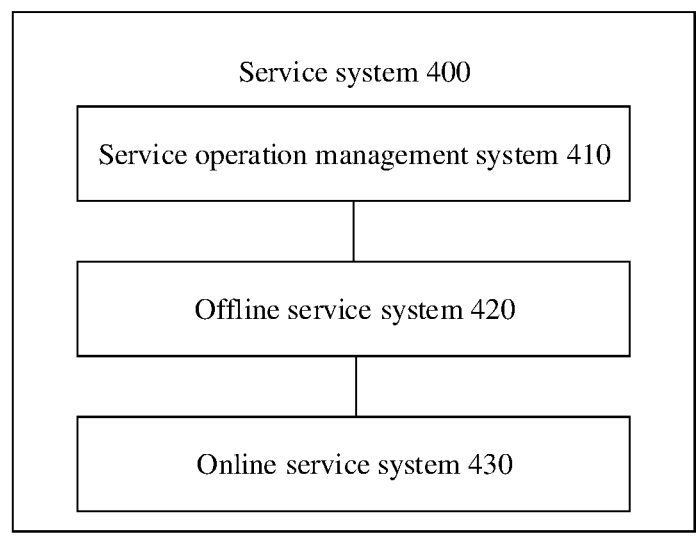
FIG. 6 is a schematic block diagram of a service system according to an embodiment of this application.

FIG. 6 is a schematic block diagram of a service system 400 according to an embodiment of this application. As shown in FIG. 6, the service system 400 includes a service operation management system 410, an offline service system 420, and an online service system 430.

The service operation management system 410 is configured to receive a first service content candidate set delivered by a service content deliverer.

The service operation management system 410 is further configured to send the first service content candidate set to the offline service system 420.

The offline service system 420 is configured to determine label information of service content in the first service content candidate set and send to the label information to the online service system 430.

The online service system 430 is configured to receive service content request information sent by a terminal device.

The online service system 430 is further configured to determine a second service content candidate set from the first service content candidate set based on the service content request information.

The online service system 430 is further configured to send service content request response information to the terminal device. The service content request response information includes the second service content candidate set and label information of service content in the second service content candidate set.

Optionally, the offline service system 420 is further configured to:
- receive a user behavior event sent by the terminal device; and
- based on the user behavior event, determine a user behavior attribute and user audience targeting information, and train a personalized recommendation model.

Optionally, the online service system 430 is specifically configured to:
- perform matching and filtering on the service content in the first service content candidate set based on the user behavior attribute, the user audience targeting information, and the label information of the service content; and
- performing CTR prediction and ranking on service content obtained after matching and filtering, to obtain the second service content candidate set.

It should be understood that the service system 400 may correspond to the service system in the method 100, or may correspond to the advertisement service system in the method 200. The service operation management system 410 may correspond to the service operation management system in the method 100, or may correspond to the advertisement operation management system in the method 200. The offline service system 420 may correspond to the cloud-side offline service system in the method 100, or may correspond to the offline advertisement platform in the method 200. The online service system 430 may correspond to the cloud-side online service system in the method 100, or may correspond to the online advertisement platform in the method 200.

Figure 7:
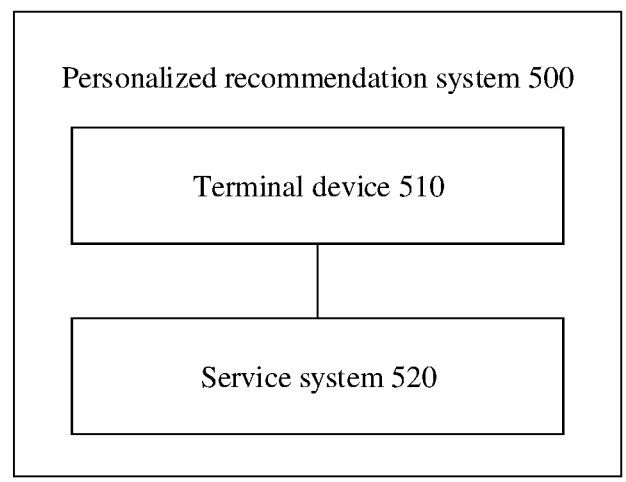
FIG. 7 is a schematic structural diagram of a personalized recommendation system according to an embodiment of this application.

FIG. 7 is a schematic block diagram of a personalized recommendation system 500 according to an embodiment of this application. As shown in FIG. 7, the personalized recommendation system includes a terminal device 510 and a service system 520. The terminal device may be the terminal device 300, and the service system may be the service system 400.

A person of ordinary skill in the art may be aware that, in combination with the examples described in the embodiments disclosed in this specification, units and algorithm steps may be implemented by electronic hardware or a combination of computer software and electronic hardware. Whether the functions are performed in a hardware or software manner depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
sending, by a terminal device, service content request information to a service system;
receiving, by the terminal device, service content response information sent by the service system, wherein the service content response information comprises a service content candidate set, the service content candidate set comprises a plurality of pieces of service content, the service content candidate set is obtained by the service system based on a user behavior event reported by the terminal device, and the service content response information further comprises semantic label information of each piece of the plurality of pieces of service content in the service content candidate set;
determining, by the terminal device, one or more pieces of service content from the service content candidate set based on user-authorized data and the semantic label information of each piece of the plurality of pieces of service content in the service content candidate set, wherein determining, by the terminal device, the one or more pieces of service content based on the user-authorized data and the semantic label information of each piece of the plurality of pieces of service content in the service content candidate set comprises:
determining, by the terminal device based on the user-authorized data and the semantic label information of each piece of the plurality of pieces of service content, a correlation coefficient between each piece of the plurality of pieces of service content and the user-authorized data; and determining, by the terminal device, the one or more pieces of service content based on each determined correlation coefficient; and displaying, by the terminal device, the one or more pieces of service content.

2. The method according to claim 1, wherein the plurality of pieces of service content are pieces of massive service content that are of the service system and that are real-time updated.

3. The method according to claim 2, wherein each piece of the plurality of pieces of service content comprises one or more of an advertisement service, a video service, or a news service.

4. A method, comprising:
receiving, by a service system, service content request information sent by a terminal device;
determining, by the service system, a service content candidate set based on the service content request information, wherein the service content candidate set comprises a plurality of pieces of service content;
sending, by the service system, service content response information to the terminal device, wherein the service content response information comprises the service content candidate set and semantic label information of each piece of the plurality of pieces of service content in the service content candidate set;
determining, by the terminal device, one or more pieces of service content from the service content candidate set based on user-authorized data and the semantic label information of each piece of the plurality of pieces of service content in the service content candidate set, wherein determining, by the terminal device, the one or more pieces of service content based on the user-authorized data and the semantic label information of each piece of the plurality of pieces of service content in the service content candidate set comprises:
determining, by the terminal device based on the user-authorized data and the label information of each piece of the plurality of pieces of service content, a correlation coefficient between each piece of the plurality of pieces of service content and the user-authorized data; and
determining, by the terminal device, the one or more pieces of service content based on each determined correlation coefficient; and
displaying, by the terminal device, the one or more pieces of service content.

5. The method according to claim 4, further comprising:
before sending, by the service system, the service content response information to the terminal device, determining, by the service system, the semantic label information of each piece of the plurality of pieces of service content according to a preset algorithm.

6. The method according to claim 5, wherein determining, by the service system, the service content candidate set based on the service content request information comprises:
receiving, by the service system, a user behavior event sent by the terminal device;
determining, by the service system, a user behavior attribute and user audience group information based on the user behavior event; and
determining, by the service system based on the user behavior attribute and the user audience group information, the service content candidate set from service content stored in the service system.

7. The method according to claim 4, wherein determining, by the service system, the service content candidate set based on the service content request information comprises:
receiving, by the service system, a user behavior event sent by the terminal device;
determining, by the service system, a user behavior attribute and user audience group information based on the user behavior event; and
determining, by the service system based on the user behavior attribute and the user audience group information, the service content candidate set from service content stored in the service system.

8. The method according to claim 4, wherein the plurality of pieces of service content are one or more of pieces of massive service content that are of the service system and that are real-time updated.

9. The method according to claim 8, wherein each piece of the plurality of pieces of service content is an advertisement service, a video service, or a news service.

10. A system, comprising:
a terminal device, comprising a processor and a memory, wherein the memory stores one or more programs; and
a service system, comprising:
a service operation management system, configured to send a first service content candidate set to an offline service system;
the offline service system, configured to:
determine semantic label information of service content in the first service content candidate set according to a preset algorithm; and
send the semantic label information of the service content in the first service content candidate set to an online service system; and
the online service system, configured to:
receive service content request information sent by the terminal device;
determine a second service content candidate set from the first service content candidate set based on the service content request information, wherein the second service content candidate set comprises a plurality of pieces of service content; and
send service content response information to the terminal device, wherein the service content response information comprises the second service content candidate set and semantic label information of each piece of the plurality of pieces of service content in the second service content candidate set; and
wherein when the one or more programs are executed by the processor, the terminal device is caused to perform the following:
determining one or more pieces of service content from the plurality of pieces of service content based on user-authorized data and the semantic label information of each piece of the plurality of pieces of service content, wherein determining the one or more pieces of service content from the plurality of pieces of service content based on user authorized data and the semantic label information of each piece of the plurality of pieces of service content comprise:
determining, based on the user-authorized data and the semantic label information of each piece of the plurality of pieces of service content, a correlation coefficient between each piece of the plurality of pieces of service content and the user-authorized data; and determining the one or more pieces of service content based on each determined correlation coefficient; and displaying the one or more pieces of service content.

11. The system according to claim 10, wherein the offline service system is further configured to:

receive a user behavior event sent by the terminal device;

determine a user behavior attribute and user audience group information based on the user behavior event; and send the user behavior attribute and the user audience group information to the online service system; and wherein the online service system is configured to:

determine the second service content candidate set from the first service content candidate set based on the user behavior attribute, the user audience group information, and the label information of the plurality of pieces of service content in the first service content candidate set.

12. The system according to claim 10, wherein the service content in the first service content candidate set is massive service content that is real-time updated.

13. The system according to claim 12, wherein the plurality of pieces of service content are one or more pieces of an advertisement service, a video service, or a news service.

14. The system according to claim 12, wherein the offline service system is further configured to:

receive a user behavior event sent by the terminal device;

determine a user behavior attribute and user audience group information based on the user behavior event; and send the user behavior attribute and the user audience group information to the online service system; and wherein the online service system is configured to:

determine the second service content candidate set from the first service content candidate set based on the user behavior attribute, the user audience group information, and the label information of the plurality of pieces of service content in the first service content candidate set.

* * * * *